(12) United States Patent
Staton et al.

(10) Patent No.: US 12,317,007 B2
(45) Date of Patent: May 27, 2025

(54) PROJECTION MAPPING SYSTEM AND APPARATUS

(71) Applicant: Newtonoid Technologies, L.L.C., Liberty, MO (US)

(72) Inventors: Fielding B. Staton, Liberty, MO (US); David Strumpf, Columbia, MO (US)

(73) Assignee: Newtonoid Technologies, L.L.C., Liberty, MO (US)

( * ) Notice: Subject to any disclaimer, the term of this patent is extended or adjusted under 35 U.S.C. 154(b) by 0 days.

(21) Appl. No.: 18/394,229

(22) Filed: Dec. 22, 2023

(65) Prior Publication Data

US 2024/0129442 A1  Apr. 18, 2024

Related U.S. Application Data

(60) Division of application No. 16/701,727, filed on Dec. 3, 2019, now Pat. No. 11,856,336, which is a continuation-in-part of application No. 16/278,628, filed on Feb. 18, 2019, now Pat. No. 10,495,961, which is a continuation-in-part of application No. 16/036,772, filed on Jul. 16, 2018, now Pat. No.
(Continued)

(51) Int. Cl.
| | |
|---|---|
| H04N 9/31 | (2006.01) |
| G01B 3/1061 | (2020.01) |
| G01B 3/1069 | (2020.01) |
| G02B 27/01 | (2006.01) |

(52) U.S. Cl.
CPC ......... H04N 9/3152 (2013.01); G01B 3/1061 (2013.01); G02B 27/0101 (2013.01); H04N 9/3194 (2013.01); G01B 3/1069 (2020.01); G02B 2027/011 (2013.01)

(58) Field of Classification Search
CPC ... G01B 3/1061; G01B 3/1069; H04N 9/3152
USPC .......................................................... 353/28
See application file for complete search history.

(56) References Cited

U.S. PATENT DOCUMENTS

| | | |
|---|---|---|
| 6,535,182 B2 | 3/2003 | Stanton |
| 9,716,870 B2 | 7/2017 | Sano et al. |

(Continued)

FOREIGN PATENT DOCUMENTS

| | | |
|---|---|---|
| CN | 202033008 U | 11/2011 |
| CN | 106797456 A | 2/2019 |

(Continued)

OTHER PUBLICATIONS

Extended European Search Report, dated Aug. 31, 2018, issued in EP Application No. 18177594.1, 5 pages.
(Continued)

*Primary Examiner* — Jerry L Brooks
(74) *Attorney, Agent, or Firm* — AVEK IP, LLC

(57) ABSTRACT

A marking and display system includes a scanning apparatus, comprising a processor in data communication with a networking device, at least one input/output device, and computer memory, the computer memory comprising a program having machine readable instructions that, when effected by processor, perform the following steps: (a) scan an area of interest for a first scan; (b) determine the presence of at least one abnormality at the area of interest; and (c) provide a marking at an area substantially adjacent the at least one abnormality.

16 Claims, 15 Drawing Sheets

Related U.S. Application Data 10,212,404, which is a continuation-in-part of application No. 15/622,959, filed on Jun. 14, 2017, now Pat. No. 10,027,937.

(60) Provisional application No. 62/782,311, filed on Dec. 19, 2018.

(56) References Cited

U.S. PATENT DOCUMENTS

| | | |
|---|---|---|
| 2005/0117132 A1 | 6/2005 | Agostinelli |
| 2005/0179875 A1 | 8/2005 | Aoyanagi |
| 2008/0212039 A1 | 9/2008 | Taylor |
| 2008/0239250 A1 | 10/2008 | Jose |
| 2011/0176119 A1 | 7/2011 | Jung et al. |
| 2011/0221781 A1 | 9/2011 | Okamoto |
| 2012/0050688 A1 | 3/2012 | Wu et al. |
| 2013/0235082 A1 | 9/2013 | Furui |
| 2014/0253867 A1 | 9/2014 | Jiang et al. |
| 2014/0268064 A1 | 9/2014 | Kahle et al. |
| 2015/0168821 A1* | 6/2015 | Negretti .............. G03B 21/206 353/85 |
| 2015/0331302 A1 | 11/2015 | Watanuki et al. |
| 2016/0295186 A1 | 10/2016 | Chen et al. |

FOREIGN PATENT DOCUMENTS

| | | |
|---|---|---|
| JP | 2016142562 A | 8/2016 |
| KR | 101425862 B | 8/2014 |
| TW | 201626116 A | 10/2017 |
| TW | 201708985 A | 4/2020 |

OTHER PUBLICATIONS

First Examination Report, dated Aug. 1, 2018, issued in AU Application No. 2018204201, 10 pages.

First Examination Report (w/Eng translation), dated Mar. 18, 2021, issued in MX Application No. MX/a/2018/007306, 6 pages.

First Office Action, dated Nov. 6, 2018, TW Application No. 107120212, 7 pages.

Notice of Allowance dated Sep. 4, 2018, KR Application No. 10-2018-0067598, 3 pages.

Notice of Preliminary Rejection, dated Jul. 24, 2018, KR Application No. 10-2018-0067598, 11 pages.

Occipital Tape Measure, http://www.businessinsider.com/occipital-tapmeasure-app-arkit-2017-9/#tap—measure-can-accurately-measure-parts-of-your-home-or-office-1, Business Insider, Tech Insider, dated Sep. 19, 2017.

* cited by examiner

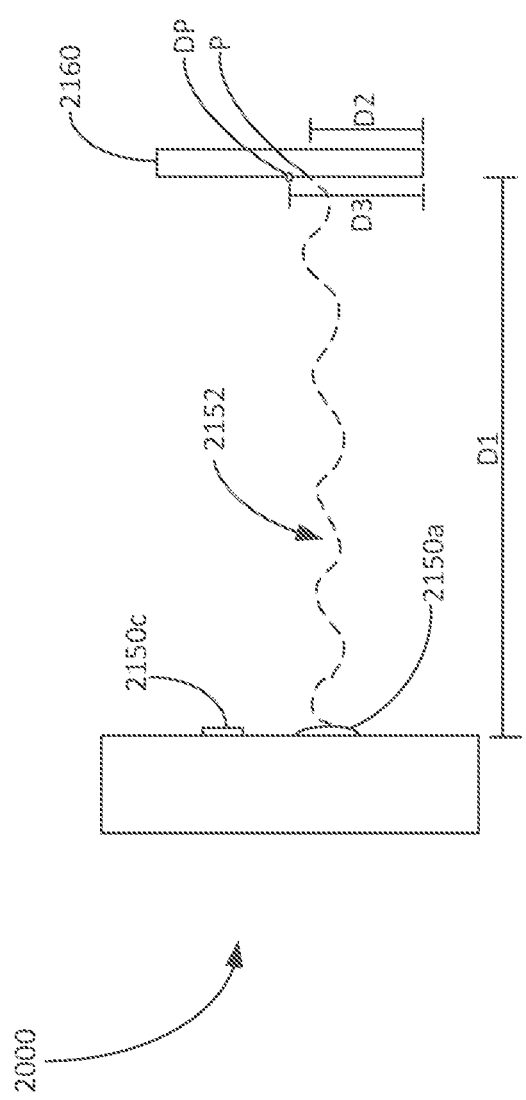
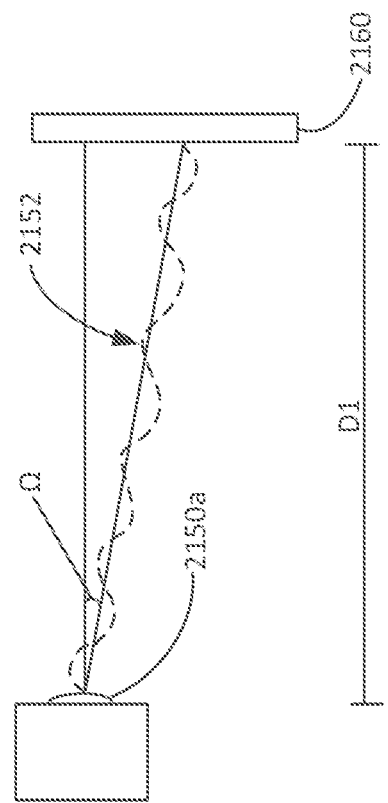
FIG. 13A
FIG. 13B

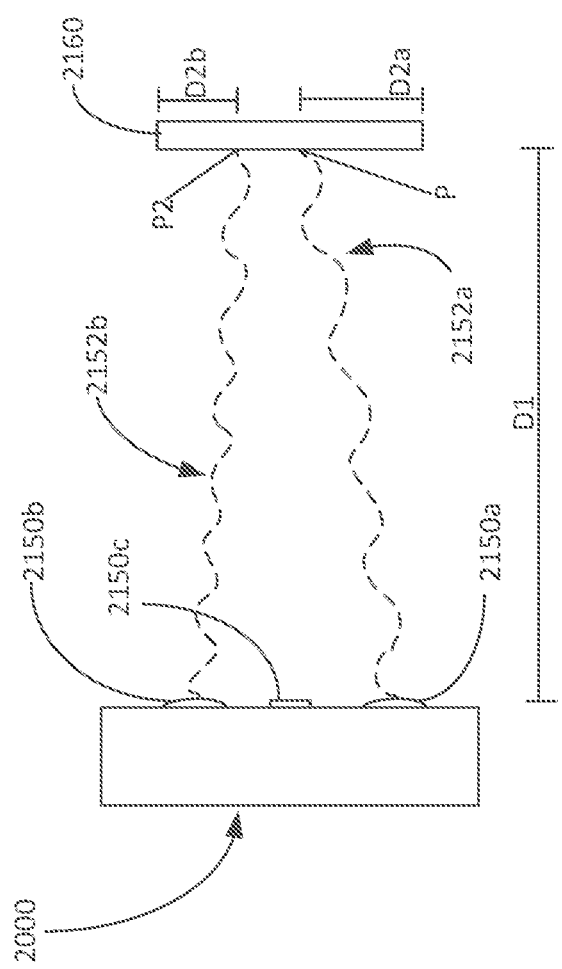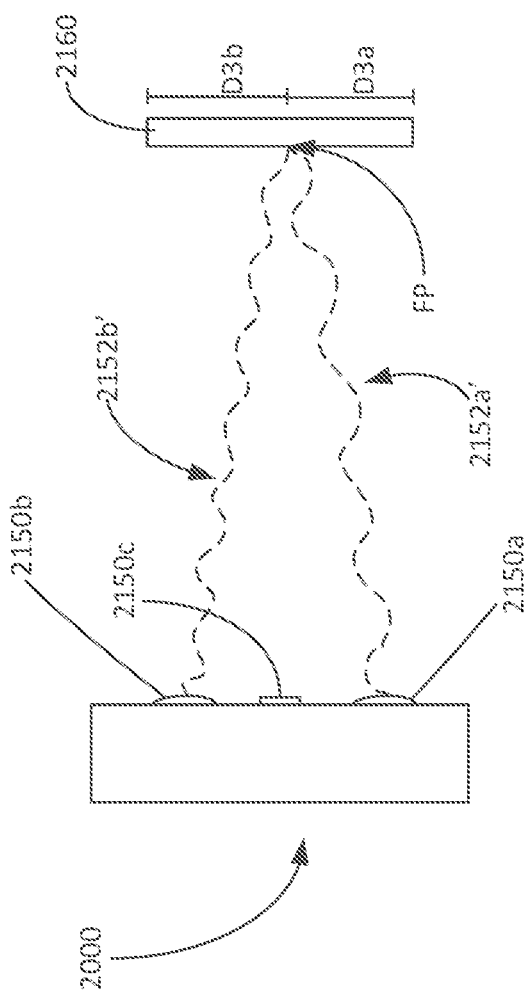
FIG. 14A
FIG. 14B

PROJECTION MAPPING SYSTEM AND APPARATUS

CROSS-REFERENCE TO RELATED APPLICATIONS

This application is a divisional of U.S. patent application Ser. No. 16/701,727, filed Dec. 3, 2019, and which claims priority to U.S. Provisional Patent Application No. 62/782,311, filed Dec. 19, 2018. The '727 application is also a continuation-in-part of U.S. patent application Ser. No. 16/278,628, filed Feb. 18, 2019, which issued as U.S. Pat. No. 10,495,961 and which is a continuation-in-part of U.S. patent application Ser. No. 16/036,772, filed Jul. 16, 2018, which granted as U.S. Pat. No. 10,212,404 and which is a continuation-in-part of U.S. patent application Ser. No. 15/622,959, filed Jun. 14, 2017, which granted at U.S. Pat. No. 10,027,937. Each of the foregoing applications is incorporated herein by reference in its entirety.

FIELD OF INVENTION

The invention relates to projection mapping apparatus. More specifically, the invention relates to an apparatus for projecting an image onto a surface. The image may or may not be human readable.

BACKGROUND

Projection displays have been around for several years in many different forms. While many industries take advantage of projection technology, one industry where such technology has been largely ignored is hand tools. Generally speaking, hand tools have seen relatively few advancements over the years. This is especially true when it comes to tape measures.

Currently, tape measures are effective for their intended purpose. However, they tend to be bulky and somewhat difficult to use, as a user must both lay out the tape measure upon a surface and mark the surface while attempting to hold the tape measure in position. This often results in frustration, especially when the tape measure becomes dislodged from its desired position, twists, or the user has to take measure many different surfaces. Accordingly, it would be desirable to have a projection tape measure which allows a user to measure a surface without requiring him or her to physically hold any device.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere herein.

In one embodiment, a projection system includes a projection apparatus embodied in a housing secured to a user. The projection apparatus has a processor in data communication with a networking device, at least one input/output device, and computer memory. The computer memory includes a program with machine readable instructions that, when effected by processor, perform the following steps: (a) determine an edge of a surface to be measured; (b) project an initial image onto the surface, the initial image being based on a predetermined set of conditions; (c) determine a substantially perpendicular distance D1 between the projection apparatus and the surface; (d) determine a distance D2 between the projection apparatus and the edge of the surface; (e) calibrate the initial image based on the distances D1 and D2 determined in steps (c) and (d); and (f) project an updated image onto the surface.

In another embodiment, a projection system comprises a reference device comprising a processor in data communication with a networking device and at least one input/output device. The reference device is placed at an edge of a surface to be measured. The system further includes a projection apparatus embodied in a housing secured to a user. The projection apparatus comprises a processor in data communication with a networking device, at least one input/output device, and computer memory. The computer memory includes a program having machine readable instructions that, when effected by processor, performs the following steps: (a) projecting an initial image onto the surface, the initial image being based on a predetermined set of conditions; (b) determining a substantially perpendicular distance D1 between the projection apparatus and the surface; (c) determining a distance D2 between the projection apparatus and the reference device; (d) calibrating the initial image based on the distances D1 and D2 determined in steps (b) and (c); (e) projecting an updated image onto the surface; and (f) repeating steps (b)— (e). The reference device and the projection apparatus communicate over a network.

In still another embodiment, a projection system has a reference device and a projection apparatus embodied in a housing secured to a user. The projection apparatus includes a processor in data communication with a networking device, at least one input/output device, and computer memory. The computer memory includes a program having machine readable instructions that, when effected by processor, perform the following steps: (a) projecting an initial image onto the surface, the initial image being based on a predetermined set of conditions; (b) determining a substantially perpendicular distance D1 between the projection apparatus and the surface; (c) determining a distance D2 between the projection apparatus and the reference device; (d) calibrating the initial image based on the distances D1 and D2 determined in steps (b) and (c); (e) projecting an updated image onto the surface; and (f) repeating steps (b)-(e).

In still another embodiment, a marking and display system includes a first array display apparatus having a viewing angle. The display apparatus has a processor in data communication with a networking device, at least one input/output device, and computer memory. The computer memory includes a program having machine readable instructions that, when effected by processor, iteratively perform the following steps: (a) determining the presence of a distant surface; (b) marking, within the viewing angle, an edge of the distant surface and a plurality of locations on the distant surface; (c) displaying an initial array onto an array receiving panel having a first panel edge and a second panel edge; (d) determining a distance $D1_a$–$D1_n$ between the display apparatus and each of the plurality of locations on the distant surface; (e) determining a forward distance D2 between the display apparatus and the array receiving panel; (f) determining a distance D3 between the display apparatus and the edge of the distant surface; (g) determining a distance D4 between the first panel edge and the second panel edge; (h) calibrating the initial array on the array receiving panel based on the distances D1a-D1n, D2, D3, and D4; and (i) projecting an updated array onto the array receiving panel.

In a further apparatus, a marking and display system has an array display apparatus with a viewing angle. The system comprises a processor in data communication with a networking device, at least one input/output device, and computer memory, the computer memory comprising a program having machine readable instructions that, when effected by processor, iteratively perform the following steps: (a) determining the presence of a distant surface; (b) marking, within the viewing angle, an edge of the distant surface and a plurality of locations on the distant surface; (c) displaying an initial array onto an array receiving panel having a first panel edge and a second panel edge; (d) determining a distance $D1_a$-$D1_n$ between the display apparatus and each of the plurality of locations on the distant surface; (e) determining a forward distance D2 between the display apparatus and the array receiving panel; (f) determining a distance D3 between the display apparatus and the edge of the distant surface; (g) determining a distance D4 between the first panel edge and the second panel edge; (h) calibrating the initial array on the array receiving panel based on the distances D1a-D1n, D2, D3, and D4; (i) projecting an updated array onto the array receiving panel; (k) repeating steps (a) through (f) and (h). At step (c), the initial array displayed on the array receiving panel is substituted with the updated array from step (j); and the updated array at step (j) is replaced by a second updated array.

In still yet another embodiment, a marking and display system includes an array display apparatus having a viewing angle. The system further comprises a processor in data communication with a networking device, at least one input/output device, and computer memory, the computer memory comprising a program having machine readable instructions that, when effected by processor, iteratively perform the following steps: (a) determining the presence of a distant surface; (b) marking, within the viewing angle, an edge of the distant surface and a location on the distant surface; (c) determining the presence of an environmental object of the distant surface; (d) displaying an initial array onto a windshield having a first edge and a second edge, the initial array being based on the environmental object; (e) determining a distance D1 between the display apparatus and the location on the distant surface; (f) determining a forward distance D2 between the display apparatus and the windshield; (g) determining a distance D3 between the display apparatus and the edge of the distant surface; (h) determining a distance D4 between the windshield first edge and second edge; (i) calibrating the initial array on the windshield based on the distances D1, D2, D3, and D4; and (j) projecting an updated array onto the array receiving panel.

According to still another embodiment, a light emitting system comprises a light emission apparatus spatially separated from a receiving panel. The light emission apparatus includes a processor in data communication with a first light source and computer memory, and the computer memory has machine readable instructions that, when effected by the processor, perform the following steps: (a) activate the first light source to emit a first light wave in the direction of the receiving plane at an emission angle $\Omega_1$; (b) determine a distance D1 between the receiving plane and the light emission apparatus; (c) determine a first edge of the receiving plane; (d) determine a first receiving location of the first light wave on the receiving plane; (e) determine a distance D2 between the first edge of the receiving plane and the first receiving location; (f) adjust the first light source based on the distances D1, D2, and the emission angle $\Omega_1$; and (g) activate the first light source to emit an adjusted first light wave in the direction of the receiving panel.

According to still yet another embodiment, a light emitting system has a light emission apparatus spatially separated from a receiving panel. The light emission apparatus includes a processor in data communication with a camera, a first light source, and computer memory, and the computer memory has machine readable instructions that, when effected by the processor, perform the following steps: (a) activate the camera to record the receiving panel; (b) activate the first light source to emit a first light wave in the direction of the receiving plane at an emission angle $\Omega_1$; (c) determine a distance D1 between the receiving plane and the light emission apparatus; (d) determine a first edge of the receiving panel; (e) determine a first receiving location of the first light wave on the receiving panel; (f) determine a distance D2 between the first edge of the receiving panel and the first receiving location; (g) adjust the first light source based on the distances D1, D2, and the emission angle $\Omega_1$; (h) activate the first light source to emit an adjusted first light wave in the direction of the receiving panel; and (i) transmit the recording from the camera to a sharing apparatus.

In a further embodiment, a light emitting system includes a light emission apparatus spatially separated from a receiving panel. The light emission apparatus has a processor in data communication with a first light source, a second light source, and computer memory. The computer memory includes machine readable instructions that, when effected by the processor, perform the following steps: (a) activate the first light source to emit a first light wave in the direction of the receiving plane at an emission angle $\Omega_1$; (b) activate the second light source to emit a second light wave in the direction of the receiving plane at an emission angle $\Omega_2$; (c) determine a distance D1 between the receiving plane and the light emission apparatus; (d) determine a first edge and a second edge of the receiving plane, the first and second edges being parallel; (e) determine a first receiving location of the first light wave on the receiving panel; (f) determine a second receiving location of the second light wave on the receiving panel; (g) determine a preferred receiving location at the receiving panel; (h) adjust the first light source to emit an adjusted first light wave in the direction of the preferred receiving location; and (i) adjust the second light source to emit an adjusted second light wave in the direction of the preferred receiving location.

According to still yet another embodiment, a marking and display system includes a scanning apparatus, comprising a processor in data communication with a networking device, at least one input/output device, and computer memory, the computer memory comprising a program having machine readable instructions that, when effected by processor, perform the following steps: (a) scan an area of interest for a first scan; (b) determine the presence of at least one abnormality at the area of interest; and (c) provide a marking at an area substantially adjacent the at least one abnormality.

According to a further embodiment, a marking and display system includes a marking and scanning apparatus comprising a processor in data communication with a networking device, at least one input/output device, and computer memory. The computer memory includes a program having machine readable instructions that, when effected by processor, perform the following steps: (a) project a first image onto an area of interest; (b) scan the first image at the area of interest; (c) determine the presence of at least one abnormality at the area of interest; and (d) project a second image substantially adjacent the at least one abnormality. The first image is based on a predetermined set of conditions. And the second image is calibrated based on a determination of an edge of the abnormality.

According to yet another embodiment, a marking and display system includes a projection apparatus embodied in a housing. The projection apparatus includes a processor in data communication with computer memory. The computer memory has a program having machine readable instructions that, when effectuated by the processor, perform the following steps: (a) receive information regarding an object on a scanning area from a user; (b) project a first image onto the scanning area; (c) scan the scanning area to determine at least one characteristic about the object on the scanning area; and (d) project a second image onto the scanning area, wherein the second image is based on the first image and the information provided by the user.

BRIEF DESCRIPTION OF THE DRAWINGS

FIG. 13A is a top view of a light emitting apparatus according to an embodiment of the invention.

FIG. 13B is a side view of the light emitting apparatus of FIG. 13A.

FIGS. 14A-B are respective top views of a light emitting apparatus showing convergence of light waves at a focal point.

DETAILED DESCRIPTION

Currently, the majority of hand tools do not incorporate any type of projection system. One exception is distance finders which use ultrasonic and/or laser reflection techniques to determine a distance from the user to a surface. The user points the tool at a surface, presses a button to activate the laser, and the tool measures the distance to the location where the laser is pointed. While these devices are useful for determining the distance to a point, they are not tape measures. A tape measure cannot be substituted for a laser pointer where the user desires to, for example, mark a surface for cutting.

Disclosed herein are embodiments of projection mapping apparatus which may be useful as a tape measure projection device. Those of skill in the art shall understand that while reference is made herein to apparatus that project tape measures, other projection apparatus are contemplated within the scope of the invention and will become apparent from the description provided herein.

Figure 1:
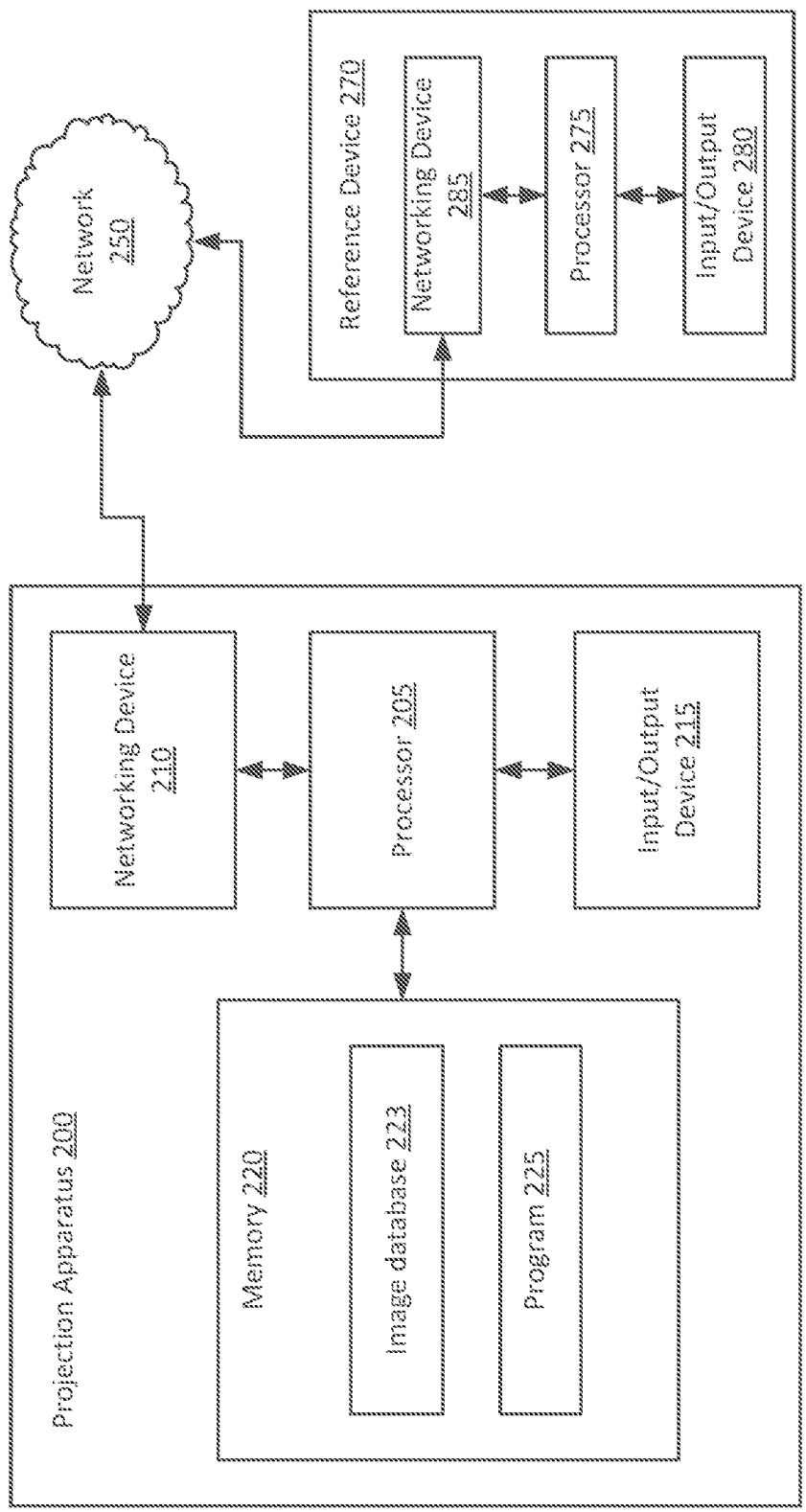
FIG. 1 is a schematic illustration of a projection apparatus and system according to an embodiment of the invention.

In one embodiment, a projection mapping system and apparatus includes a projection apparatus 200 which may be configured to attach to a user's person or incorporated into an article worn by the user as described herein. Electronic components of the projection apparatus 200 are illustrated in FIG. 1. The projection apparatus 200 includes a processor 205 communicatively coupled to a networking device 210, one or more input/output devices 215, and computer memory 220. The processor 205 may be configured through particularly configured hardware, such as an application specific integrated circuit (ASIC), field-programmable gate array (FPGA), etc., and/or through execution of software (e.g., program 225) to perform functions in accordance with the disclosure herein.

Memory 220 represents one or more of volatile memory (e.g., RAM) or non-volatile memory (e.g., ROM, FLASH, magnetic media, optical media, etc.). Although shown within the projection apparatus 200, the memory 220 may be, at least in part, implemented as network storage external to the projection apparatus 200 which may be accessed via the network device 210. The network device 210 may be implemented as one or both of a wired network interface and a wireless network interface (e.g., Wi-Fi, Internet, Bluetooth, etc.), as is known in the art.

The network device 210 may allow the projection apparatus 200 to communicate over a network 250 with a reference device 270. The network 250 may be a wireless network, such as Wi-Fi, Bluetooth, or other wireless (or wired) network.

Program 225 may be stored in a transitory or non-transitory portion of the memory 220. Program 225 includes machine readable instructions that, when executed by the processor 205, perform one or more of the functions of the device 200. In embodiments, the program 225 may include instructions for calculating distances and scales and projecting an image onto a surface (e.g., surface 100) as described in greater detail below with reference to FIG. 6.

An image database 223 may additionally be stored in the memory 220, or alternately may be stored in remote storage accessible over the network 250. The image database 223 may contain various images of tape measures which may be projected onto a surface 100 via the projection apparatus 200 according to the description provided herein. For example, there may be tape measure images that display measurements according to the metric system, and other tape measure images that display measurements according to the imperial system. Additionally, the user may prefer one color over another, and therefore there may be multiple images of tape measures in varying colors. Traditionalists may prefer the projection to show the tape measure in yellow, which others may prefer a different color (e.g., white, blue, green, orange, etc.). Accordingly, various images may be stored in the image database 223 accessible by the processor 205.

The input/output device 215 may include one or more input and/or output devices which may be embodied in a single device or multiple devices. In one embodiment, the input/output device 215 includes at least a projector for projecting an image onto a surface (e.g., surface 100). The input/output device 215 may additionally include a laser and/or a camera. Optionally, the input/output device 215 includes a UV laser for marking purposes, as is described below. In one embodiment, the input/output device 215 may further include a speaker. The input/output device 215 may still further include a button 215A and 215A' (FIGS. 2B and 4B), for example, to allow the user to interact with the apparatus 200 and/or the reference device 270, as described herein.

The reference device 270 may have a processor 275 communicatively coupled to an input/output device 280 and a network device 285. The network device 285 may allow the reference device 270 to communicate over the network 250 with the projection apparatus 200.

The input/output device 280 may be an emitting device which emits a signal (e.g., over the network 250) which may be received by the projection apparatus 200 in order to determine the distance between the reference device 270 and the projection apparatus 200. Alternately, the reference device 270 may be in communication (e.g., wired or wirelessly) with the projection apparatus 200 to communicate a distance from the projection apparatus 200 to the reference device 270.

Figure 3:
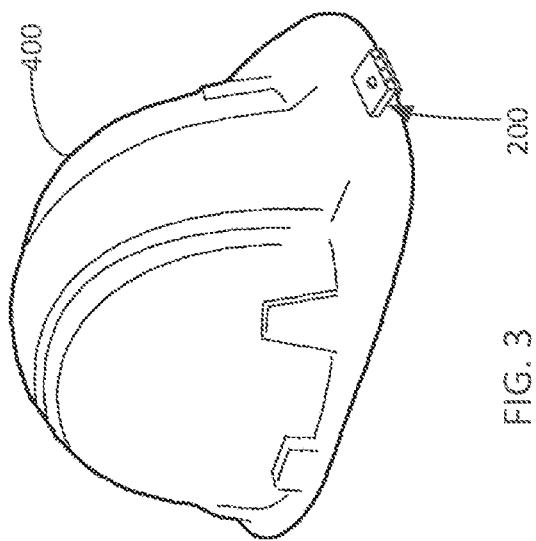
FIG. 3 is a perspective view of the projection apparatus of FIG. 2A incorporated into a hat.
Figure 2A:
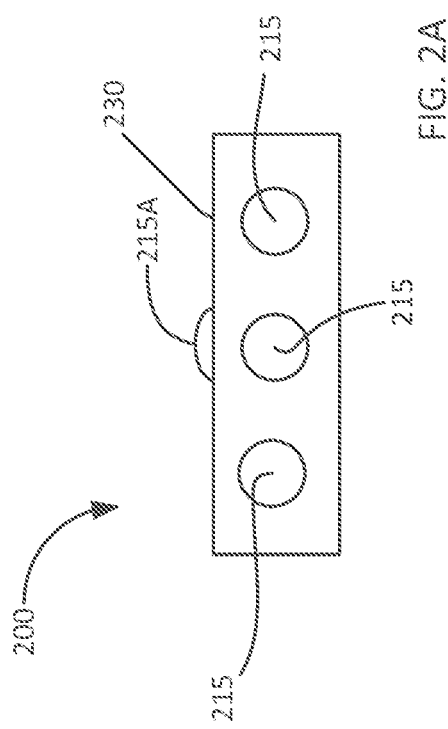
FIG. 2A is a front view of an embodiment of the projection apparatus of FIG. 1.
Figure 2B:
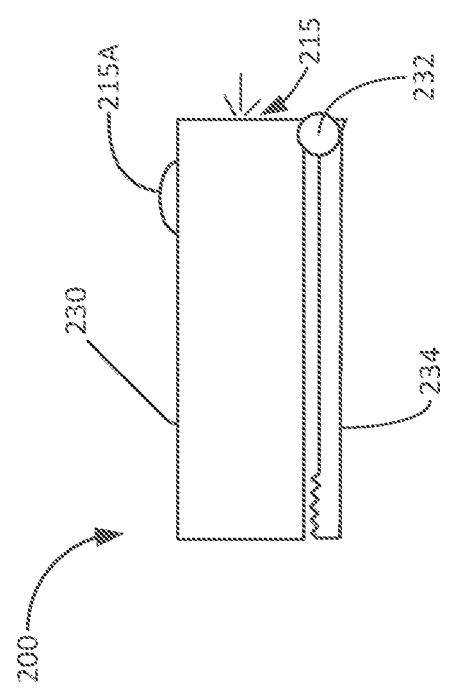
FIG. 2B is a side view of the projection apparatus of FIG. 2A.

The projection apparatus 200 may be embodied in a variety of different devices. In one embodiment, the projection apparatus 200 may be incorporated into a handheld device, similar to a laser measuring device or flashlight. In another embodiment, the projection apparatus 200 may be configured as a clip. FIGS. 2A, 2B, 4A, and 4B illustrate exemplary configurations of a clip. In FIG. 2A, the projection apparatus 200 is embodied in a clip having a housing 230 with apertures formed therein through which one or more input/output devices 215 may extend. It shall be understood by those of skill in the art that the input/output device(s) 215 may not extend all the way through the aperture, but the aperture may allow the input/output device(s) 215 to give and/or receive information to/from the system. The housing 230 further includes a button 215A which the user may use to interact with the apparatus 200. An arm 234 may rotatably attach to the housing 230 via a pin 232 (for example), and may be spring-loaded such that the arm 234 is maintained in a closed position unless the user forcibly opens the arm 234 (e.g., in order to attach the apparatus 200 to a wearable article). FIG. 3 shows a hard hat 400 with a projection apparatus 200 attached thereto. The projection apparatus 200 may alternately be attached to other wearable articles, such as a baseball cap or other type of hat, or to an article of clothing, such as to the user's collar.

Figure 5:
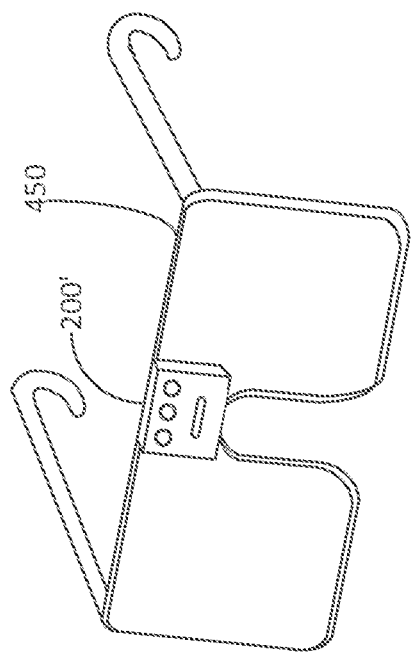
FIG. 5 is a perspective view of the projection apparatus of FIG. 4A incorporated onto a pair of glasses.
Figure 4A:
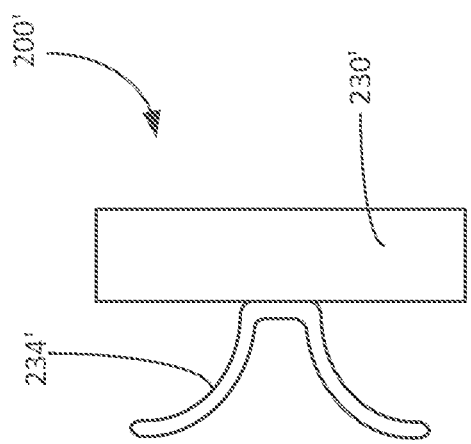
FIG. 4A is a side view of another embodiment of the projection apparatus of FIG. 1.
Figure 4B:
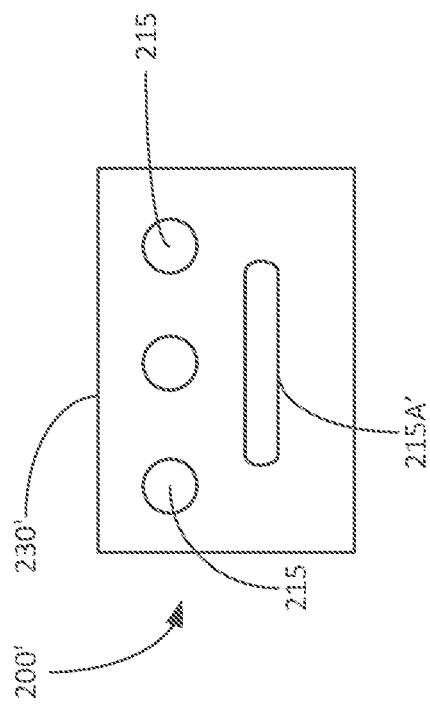
FIG. 4B is a front view of the projection apparatus of FIG. 4A.

In FIGS. 4A, 4B, and 5, an apparatus 200' is configured for attachment to safety goggles 450 or glasses. The apparatus 200' includes a housing 230' and a clip 234' which may be configured to engage with the nose bridge of the glasses 450. The clip 234' may be adjustable to ensure that the apparatus 200' is securely attached to the goggles 450. The apparatus 200' includes at least out input/output device 215, and may additionally include a button 215A' as shown in FIGS. 4B and 5.

The projection apparatus 200 may preferably be adjustable such that the input/output device 215 is appropriately oriented. For example, the housing 230 may be adjustably attached to a plate which may be secured to the arm 234 via the pin 232. The position of the housing 230 may therefore be adjusted as necessary. Alternately, in embodiments, the projection apparatus 200 may be incorporated directly into items such as the hard hat or safety goggles.

The electronic components of the apparatus 200 may be battery operated, solar powered, or may receive power by any other means now known or later developed. In one embodiment, the apparatus 200 includes a rechargeable battery which may be recharged using solar power, electrical power, etc.

Figure 6:
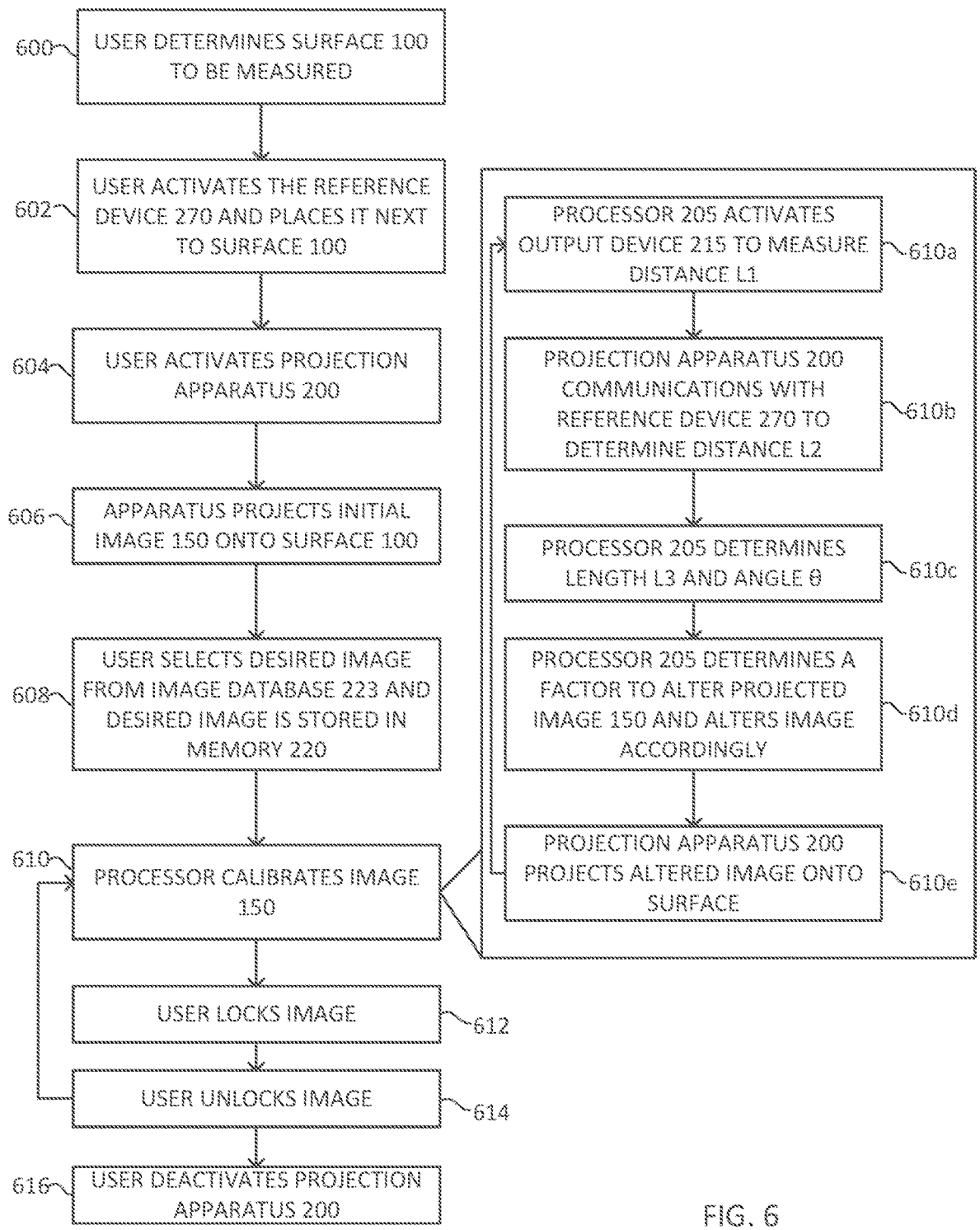
FIG. 6 is a flowchart illustrating various steps performed by projection apparatus systems according to an embodiment of the invention.
Figure 8:
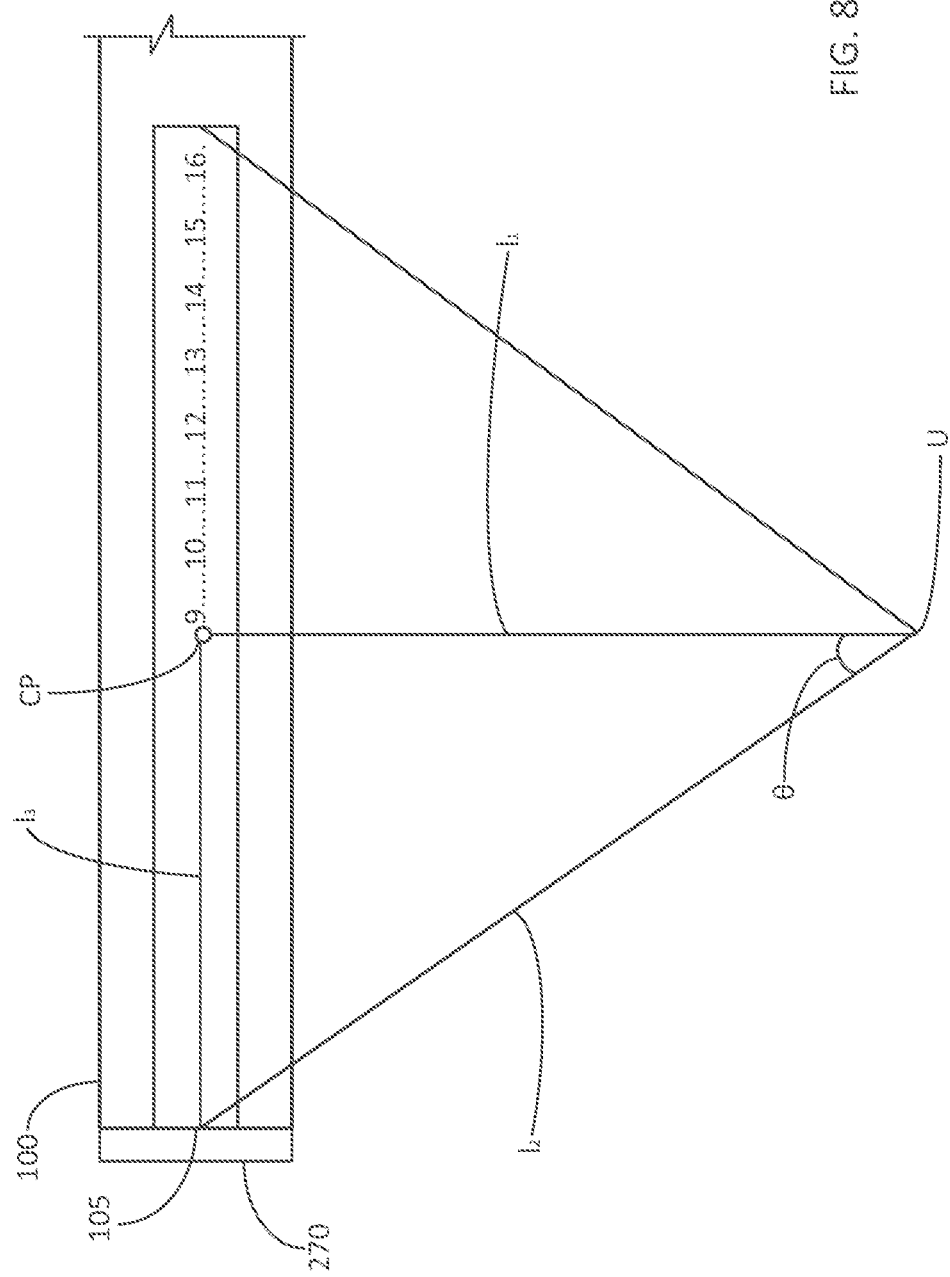
FIG. 8 is a perspective view of a projection apparatus system according to another embodiment of the invention.

The features of the various components described herein shall be further understood by way of examples of the projection apparatus 200 in a use configuration. Referring now to FIG. 6, an exemplary set of process steps is illustrated according to an embodiment of the invention. The process begins at step 600, when the user determines that a surface requires a measurement. At step 602, the user may activate the reference device 270 and places the reference device 270 such that it abuts one end of the surface 100, as shown in FIG. 8. Further discussion of the reference device 270 is provided below.

Moving on to step 604, the projection apparatus 200 is activated. The projection apparatus 200 may be activated via, for example, a button 215A on the apparatus 200. The button 215A may cause the apparatus 200 to turn to an "on" mode. Alternately, the apparatus 200 may be equipped with for example, a gyroscope which may detect movement of the user's head. When the user shakes his or her head, the apparatus 200 may be activated.

Figure 7:
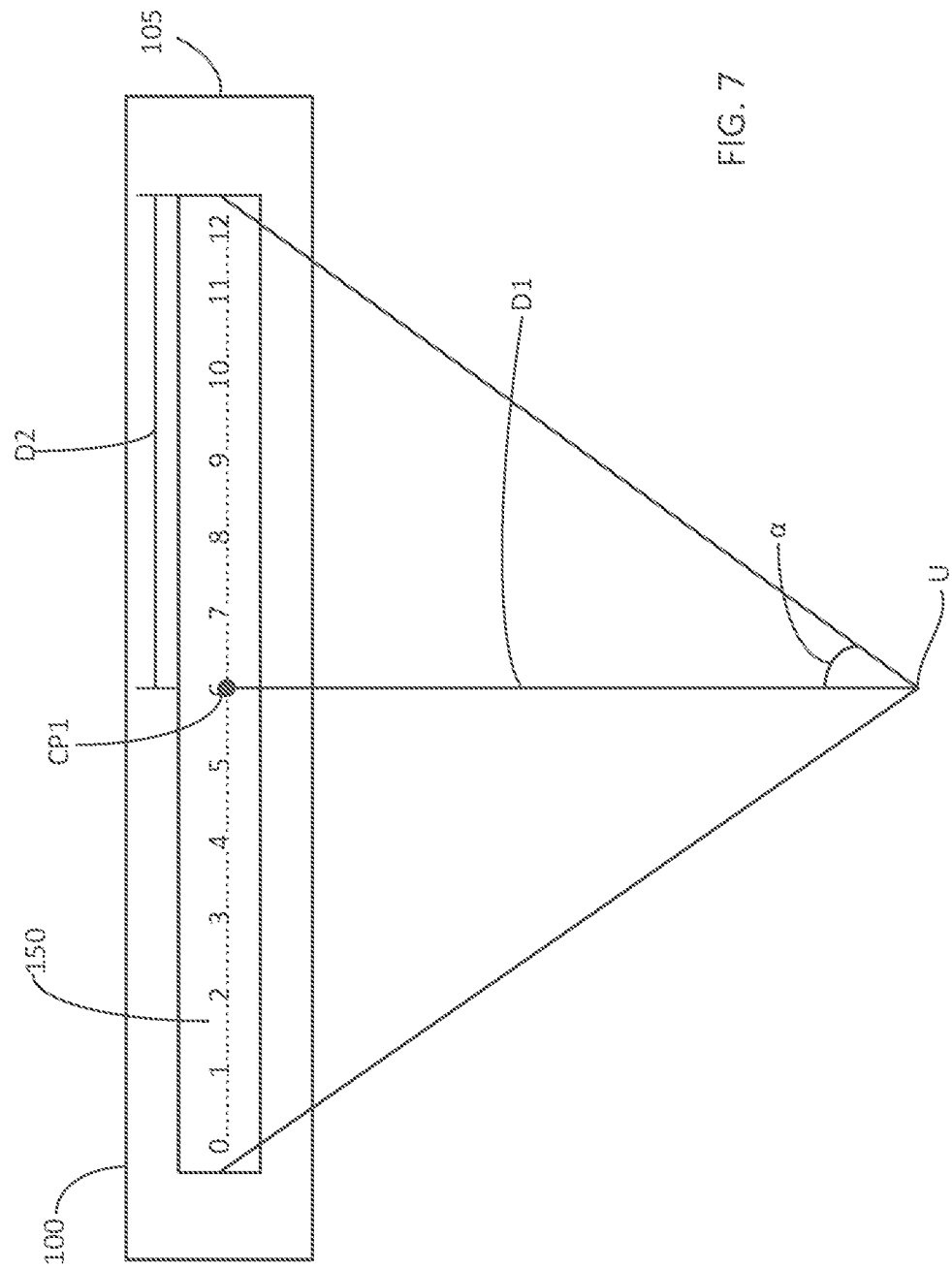
FIG. 7 is a perspective view of a projection apparatus system according to an embodiment of the invention.

At step 606, upon activation, the apparatus 200 may project an initial image 150 onto the surface 100 (see FIG. 7). The initial image 150 may not yet be the user's desired depiction of a tape measure. For example, the projection apparatus 200 may be initially programmed to project an image from the image database 223 of a tape measure showing measurements according to the imperial measurement system. However, the user may prefer that the measurements be shown according to the metric system. Additionally, the initial image 150 may be programmed to project the initial image 150 based on pre-set reference conditions. However, the reference conditions may not accurately portray the position of the user in reference to the surface 100, and therefore, the initial image 150 may project inaccurate units of measurement (e.g., one inch as projected in the initial image 150 is not a true representation of one inch).

Nevertheless, the process moves to step 608, wherein the user selects the desired tape measure image from the image database 223. The user may be able to change the image in order to customize the system of measurement (e.g., imperial or metric) by toggling through the images stored on the image database 223 to arrive at the desired image, e.g., via the button 215A or 215A'. Additionally, the user may be able to select an image that is color preferential to the user. Once the user arrives at his or her preferred image, the user's preferences may be automatically stored in the memory 220 and recalled each time the user activates the projection apparatus 200.

Moving on to step 610, once the user has selected his or her preferred image, the processor 205 begins the process of calibrating the projected image to the user's position in relation to the surface 200. As noted above, the projection apparatus 200 may be programmed to project an initial image 150 based on pre-set reference conditions at which the projected image portrays units of measurement in accurate one-inch units. For example, referring again to FIG. 7, the reference conditions may assume that a distance D1 from the projection apparatus 200 to the surface 100 is equal to 2 feet, and the distance D2 from the edge of the surface 105 to the center point CP1 of the projected image is 6 inches. At these conditions, a reference angle α between the user and the end of the surface 105, calculated using the equation cot θ=D1/D2, is 14.04 degrees. At these conditions, the projection apparatus 200 may project an image of a tape measure, wherein the increments of measurement are shown at exactly 1 inch. However, it is unlikely that the user will maintain these reference conditions. As the user moves closer to or away from the surface 100, the scale of the image must be altered such that the projected image still accurately displays the units of the tape measure. Accordingly, the position of the user relative to the surface 100 must be determined.

At step 610a, the processor 205 causes the projection apparatus 200 to activate one or more output devices 215 (e.g., a laser) to measure the actual distance $l_1$ (FIG. 8) from the user U (having the projection apparatus 200 attached thereto) to the center point CP at surface 100. Using techniques known to those of skill in the art, the distance $l_1$ may be ascertained.

At step 610b, the projection apparatus 200 communicates with the reference device 270, e.g., over the network 250 via networking devices 210 and 285, respectively, to determine the location of the reference device 270. Knowing the location of the reference device 270, the processor 205 is able to determine the distance $l_2$ between the projection apparatus 200 and the reference device 270.

The reference device 270 may, in one embodiment, be a smart phone equipped with downloadable software (e.g., a smart phone application) that allows it to communicate with the projection apparatus 200. In order to use the smart phone as the reference device 270, the user may access the smart phone application on the phone, which may, among other things, activate the networking device 285 such that the projection apparatus 200 may communicate with the phone. For example, after the distance $l_2$ is determined, a planar verification display pattern may be projected onto the surface intended to be measured. The projected display pattern could show geometric shapes with known ratios such as squares, circles, etc. The projected sequence of predictable patterns may be shown sequentially along the surface in order to verify that the surface is flat (or being measured on a common plane). Adjustments in software can be made to adjust for planar integrity for any skewing of the plane of measurement. In one embodiment, the software may be configured to adjust for contoured surfaces utilizing 3D mapping and marking techniques including stereoscopic viewing of the projected display pattern.

In embodiments, the reference device 270 may be omitted. For example, in one embodiment, the projection apparatus 200 may include a camera (e.g., as an input/output device 215). Using traditional gradient image processing techniques, the processor 205 may be able to ascertain the end 105 of the surface 100, and thus determine the length $l_2$. In still another embodiment, the end 105 of the surface 100 may be marked with a marker (e.g., via a marking device such as a UV laser, etching, red dot marking, or via any other marker currently in use or later developed). The projection apparatus 200 may be configured to recognize the marker in order to ascertain the position of the end 105 of the surface 100, and thus determine the length 12.

Moving on, at step 610c, the processor 205 determines the missing length $l_3$ based on the Pythagorean Theorem for right triangles: $a^2+b^2=c^2$. The unit of the length $l_3$ may be determined based on the user's selection of the system of measurement. For example, if the user selects the imperial system, then the lengths 11, $l_2$, and $l_3$ may be measured and determined in inches and feet. Alternately, if the user selects the metric system, then the lengths $l_1$, $l_2$, and $l_3$ may be measured and determined in centimeters and meters. More advanced non-linear methods may alternately be used to calculate the measurement of length $l_3$. One such reiterative method involves differential calculus which would allow contoured measurements of surfaces that are not residing on a single flat plane.

Having determined the length $l_3$, the processor 205 then calculates the angle θ between the user and the end of the surface 105. For example, if the user is 2.7' (32.4 inches) from the surface 100 ($l_1$), and the distance $l_2$ is determined to be 40 inches, then the angle θ between the user and the end of the surface 105 as determined by trigonometric principles is 35.9 degrees. Once the processor 105 determines the length $l_3$, and the angle θ, the process moves to step 610d. The processor 205 is not limited to a single angle θ measurement in order to provide more precise results in measurement. Multiple calculations may be made in succession in order to provide a desired precision resulting measurement.

At step 610d, the processor 205 determines the factor by which the size of the projected image must be altered such that the units of measurement of the projected image correspond with the length $l_3$ determined at step 610c. In our example, the ratio of the reference angle to the actual angle is 0.74. Therefore, the image must be scaled down in length by a factor of 0.39. Using methods of scaling known to those of skill in the art, the program may be configured to scale the projected image 150 by the appropriate factor.

At step 610e, the projection apparatus 200 projects the altered image onto the surface 100, wherein the altered image is appropriately scaled based on the position of the user to the surface 100 as described above.

Figure 9:
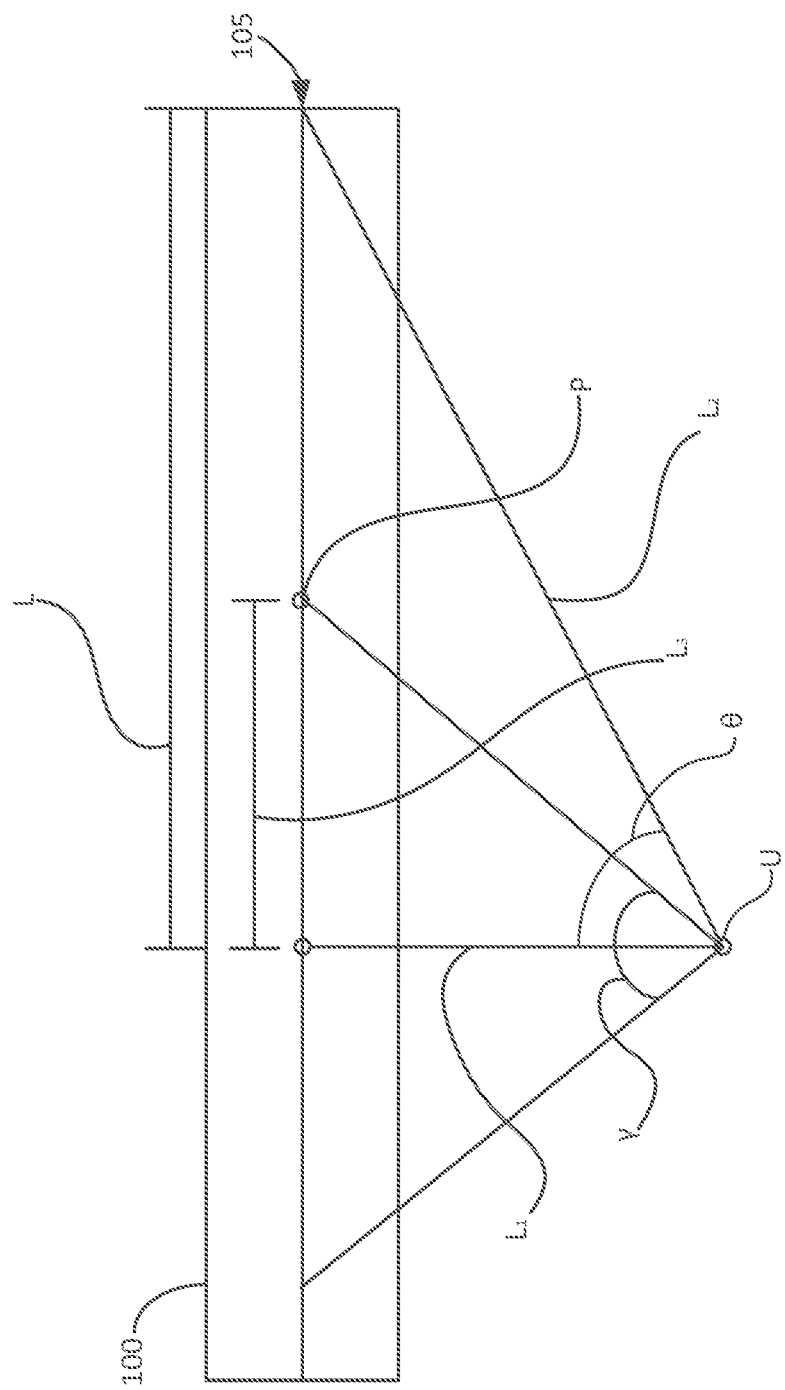
FIG. 9 is a perspective view of a projection apparatus system according to still another embodiment of the invention.

In one embodiment, illustrated in FIG. 9, the user may be a distance L from the end of the surface 105. Those of skill in the art may recognize that in order for the projected image to be as accurate as possible, it may be desirable for the user to be positioned such that the projection apparatus 200 is substantially perpendicular to the surface 100. Therefore, to measure distances that are farther away from the end of the surface 105 (e.g., distances greater than the beam angle γ, or the angle of the beam from the projection apparatus 200), the user may have to move into the general vicinity of the final measurement. The distance L may be greater than the beam angle γ. Here, the distances $L_1$ and $L_2$ may be determined as described above regarding $l_1$ and $l_2$. Using the Pythagorean Theorem, the program 223 may determine the distance L. Additionally, as the beam angle γ from the projection apparatus is known, and the distance $L_1$ may be determined as described herein, the distance $L_3$ between the center point of the projection beam and the edge of the beam may be determined. For example, using the equation tan γ=$L_3/L_1$ (wherein γ is ½ the beam angle), the program may determine distance $L_3$. Since the user may not be standing at the end 105 of the surface 100, and the beam of projection is limited, the image of the tape measure may start at point U, the unit of which may be equal to the distance L less distance $L_3$. For example, if the user is standing 20 inches from the end of the surface 105, and the beam projects an image 8 inches across, the point P will show the beginning of the tape measure starting at 16 inches.

The process may repeat steps 610a through 610e in a continuous loop to ensure that the projected image of the tape measure is consistently accurate. In one embodiment, multiple differential calculations may be made and accumulated to provide increased precision to the overall measurement results to the user.

Optionally, in one embodiment, the process moves to step 612, where the user may be able to lock the projected image. For example, the user may press the button 215A or 215A' (e.g., two quick presses of the button) to lock the image in place. Alternately, the user may be able to effectuate a movement by his head to lock the image (e.g., moving his head in a quick up-and-down movement). By locking the image in place, the user may cause the process to stall at step 620 until the image is unlocked. The user may unlock the image at step 614 by pressing the button, shaking his head, or other means. Once the image is unlocked, the process may return to step 610 as described above.

The process ends at step 616 with the user deactivating the projection apparatus 200.

In another embodiment, a projection apparatus is configured to project an image onto a surface. The image may be based on one or more direct and/or indirect measurements. In other words, one or more direct and/or indirect measurements may be utilized to provide a unique projected perspective image. In one embodiment, the projection apparatus is substantially similar to the projection apparatus 200, and includes a processor in data communication with a networking device, at least one input/output device, and computer memory that has programming that, when effected by a processor, performs various steps for providing an image. The steps include determining a distance between the projection apparatus 200 and at least one surface, and projecting an image that is based on the determined distance. The process may be iterative, and it should be understood that the image which may be projected can be dynamic, or may change over time. The image may change incrementally, or may change substantially over time.

Figure 10:
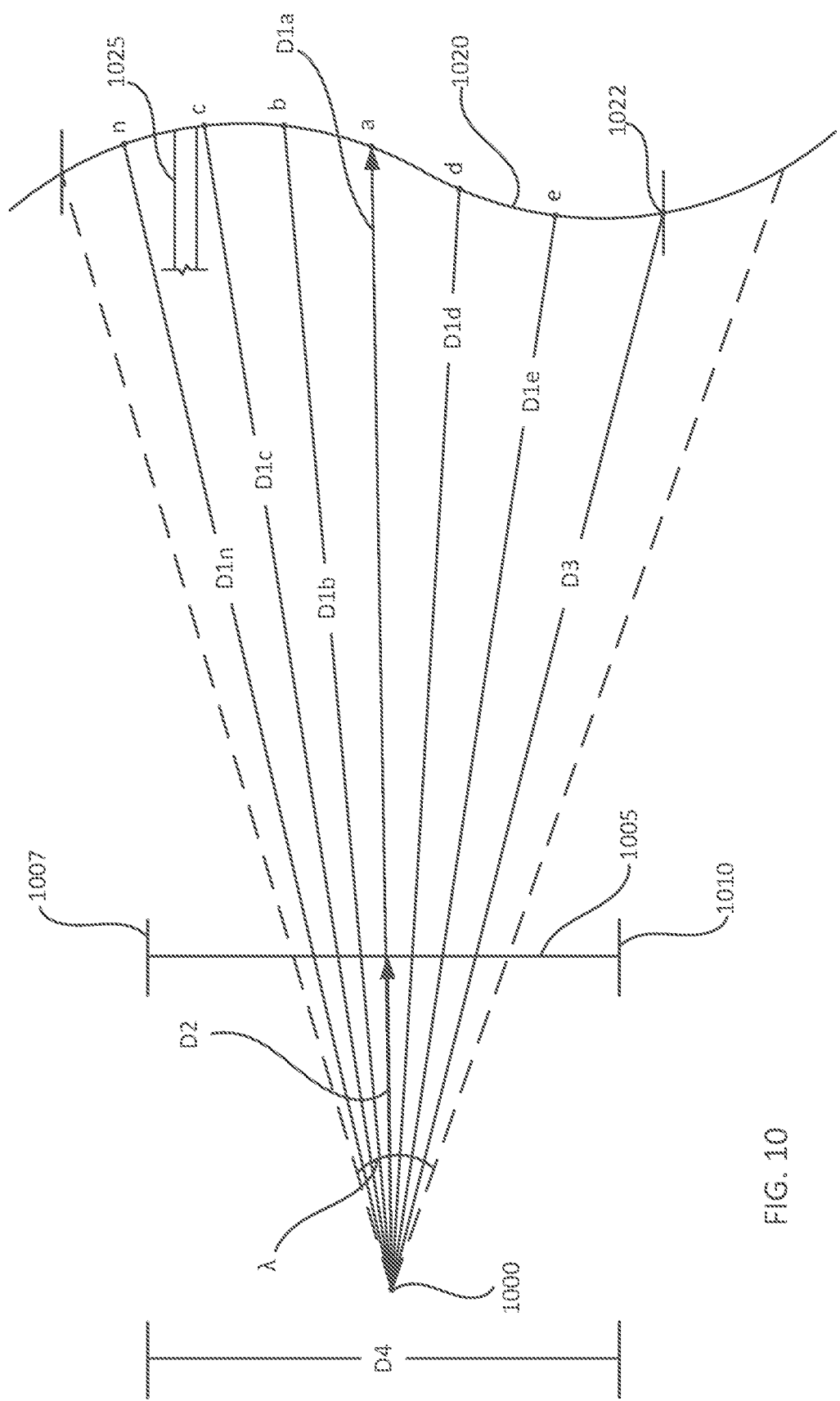
FIG. 10 is a perspective view of a projection apparatus system according to another embodiment of the invention.

According to another embodiment of the invention, illustrated in FIG. 10, a display apparatus 1000 is disposed near an array receiving surface 1005, such as a windshield. The array receiving surface 1005 has a first edge 1007 and a second edge 1010. The display apparatus 1000 has a viewing angle λ (represented by the broken lines in FIG. 10). The display apparatus 1000 may be similar to the projection apparatus 200, except as is shown and described herein. Here, display apparatus 1000 is operable to determine a distance to a surface 1020 in front of the apparatus 1000, and to display an image onto the array receiving surface 1005 that is based on information about the surface 1020. In an embodiment, the information about the surface 1020 is one or more utility lines 1025 which may be disposed above ground or underground. The information may optionally also include the surface 1020 itself. In other words, the image displayed on the array receiving surface 1005 may be of the environmental object 1025, and/or of the surface 1020. Accordingly, a user may be presented with an alternative view of the surface 1020 and the environmental objects 1025. Preferably, however, a user has an unobstructed view the surface 1020 together with a layered image of the environmental objects 1025 in order to provide the user with a useful, real-time accurate image of objects within the field of view of the apparatus 1000.

Various methods may be used to determine the information about the surface 1020. In embodiments, the display apparatus 1000 may be equipped with a camera which may scan the surface 1020 for information which is readily seen by the camera. In other embodiments, the display apparatus 1000 may be equipped with sonar technology, which may be used to send sound waves underground to determine the presence of underground utility lines. Other methods of determining underground objects, whether now known or later developed, may be used to detect the presence of objects on or under the surface 1020.

In an embodiment, the surface 1020 may be, for example, human skin (which may also include the muscles beneath the skin). The apparatus 1000 may be able to detect abnormalities under the skin which would otherwise be invisible to the human eye. For example, a doctor may use the apparatus 1000 to scan a person's arm where a broken bone is suspected. An image of the person's bones can be displayed upon the surface 1020 to give the physician an indication of where the breaks are located, and what type of reconstruction is necessary. Utilizing the image, the physician may be able to conduct a closed reduction of the broken bone(s) without requiring more invasive imaging techniques. Additionally, the displayed image can be continuously updated in real time (or substantially in real time) to provide the physician with an up-to-date image of the concerned bone structure.

Figure 11:
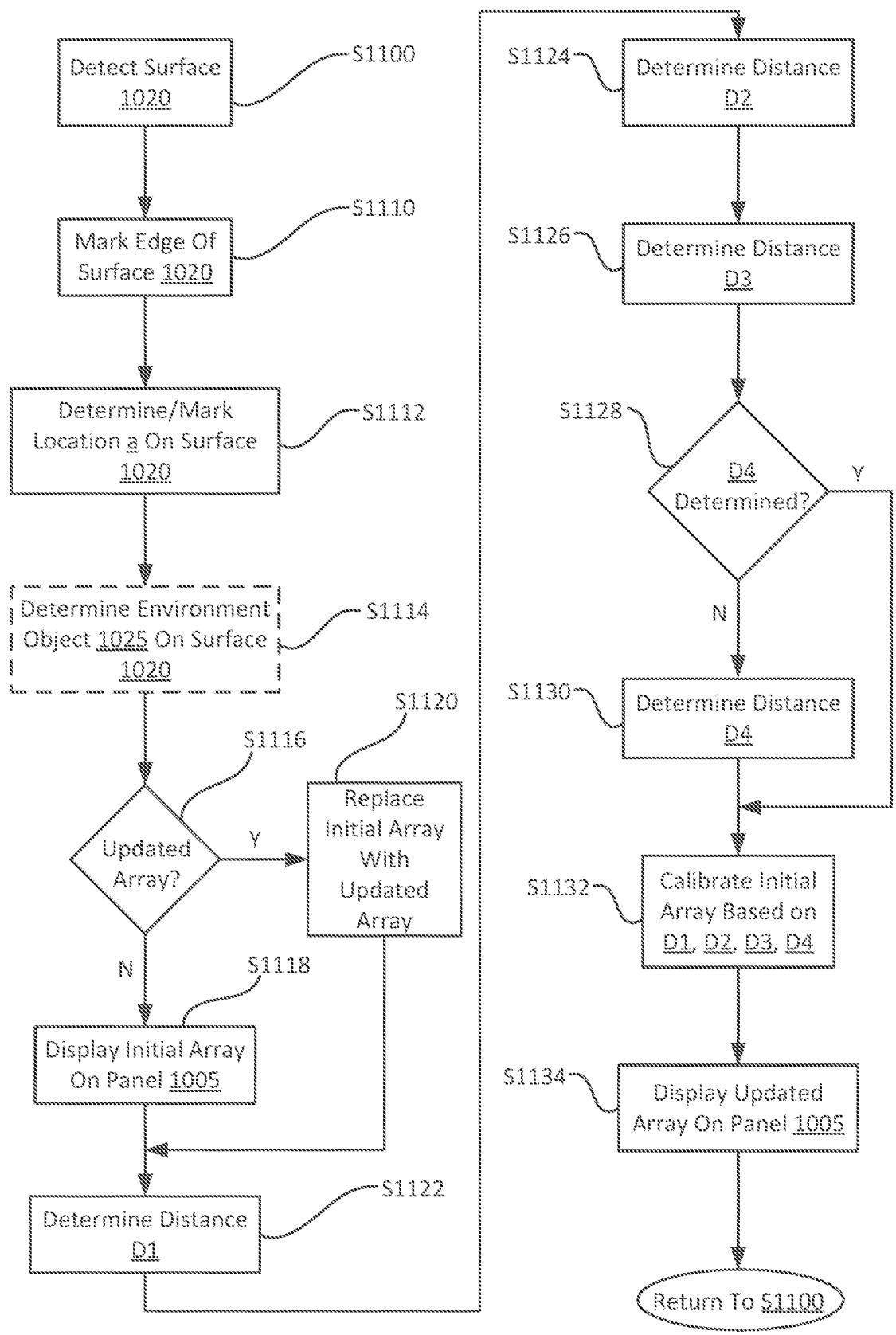
FIG. 11 is a flowchart illustrating various steps performed by projection apparatus systems according to an embodiment of the invention.

FIG. 11 is a flowchart illustrating a closed loop system having various steps performed by the display apparatus 1000 in conjunction with programming effected by a processor. The process starts at step S1100, where the display apparatus 1000 detects the presence of a surface 1020. The surface 1020 may be, for example, an area of earth or an object within the viewing panel of the display apparatus 1000. At step S1110, the apparatus 1000 marks an edge 1022 of the surface 1020. The edge 1022 is within the viewing panel of the display apparatus 1000. The apparatus 1000 then determines and marks one or more locations a-n on the surface 1020 at step S1112. Optionally, at step S1114, the apparatus 1000 may determine the presence of an environmental object (e.g., a utility line 1025) on or under the surface 1020. At step S1116, the programming determines whether the system has an updated array. If not (e.g., the first time through the process), the apparatus 1000 displays an initial array onto the image receiving surface 1005 at step S1118. If the system has an updated array, then the apparatus 1000 replaces the initial array with the updated array at step S1120, and the process moves to step S1122.

At step S1122, one or more distances Dia-Dln between the apparatus 1000 and the locations a-n on the surface 1020 are determined. At step S1124, a distance D2 between the apparatus 1000 and the image receiving surface 1005 is determined. At step S1126, a distance D2 is determined between the apparatus 1000 and the edge 1022 of the surface 1020. At step S1128, the system determines whether a distance D4 has been previously determined. If not (e.g., the first time through the process) then the process moves to step S1130, wherein a distance D4 between the edges 1005 and 1007 of the image receiving surface 1005 is determined. If the distance D4 has been previously determined, then the process moves to step S1132, where the initial array displayed at step S1118 is calibrated based on the determined distances D1, D2, D3, and D4. Step S1132 may be similar to step S610 described above, wherein the processor determines a factor to alter the image based on the distances D1, D2, D3, and D4. Finally, at step S1134, the display apparatus 1000 displays an updated array on the image receiving surface 1005. The process then repeats until the apparatus 1000 is deactivated.

Figure 12:
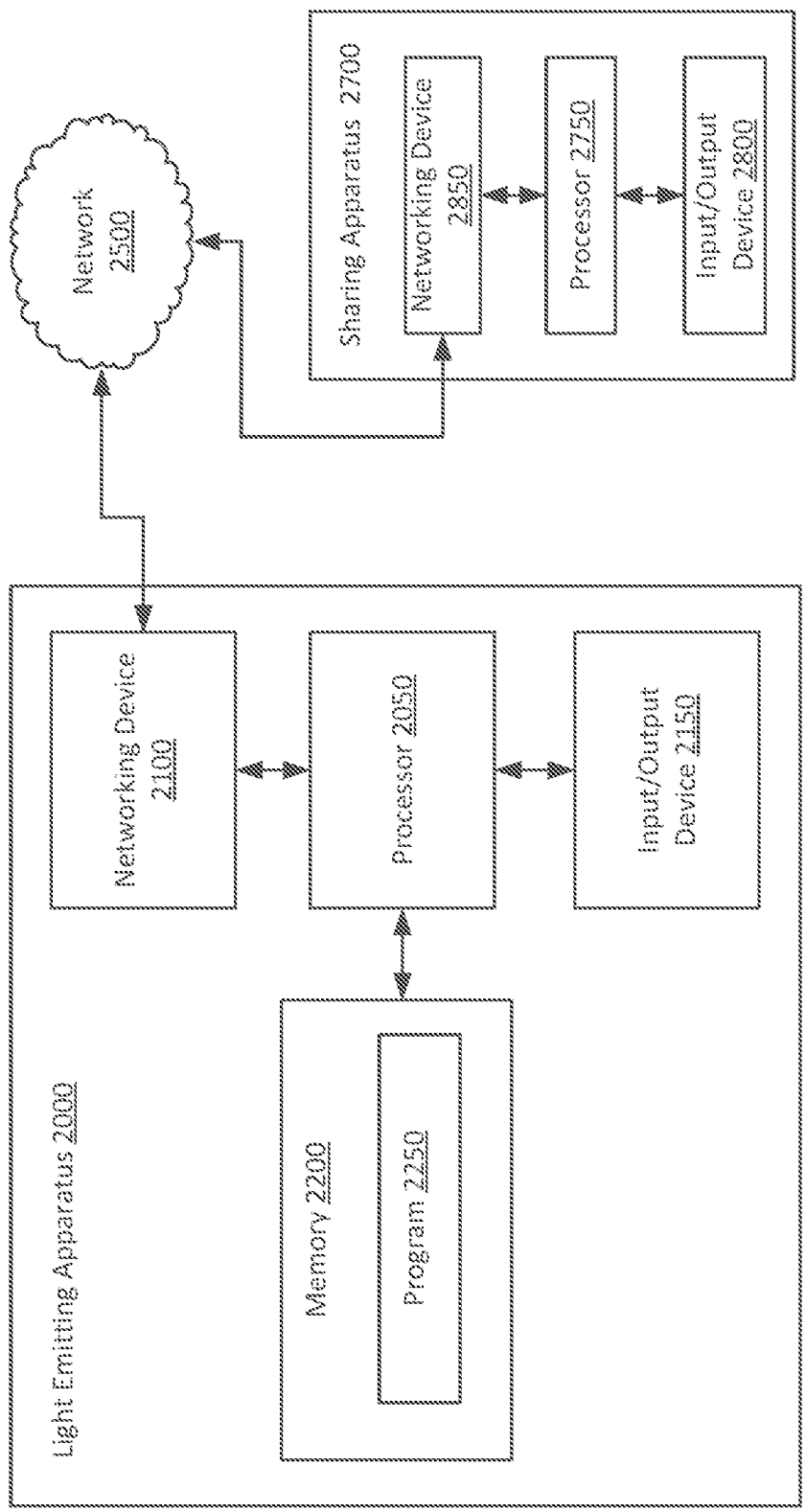
FIG. 12 is a schematic illustration of a light emitting apparatus and system according to an embodiment of the invention.

Referring now to FIG. 12, according to still another embodiment, a light emitting apparatus 2000 is provided. The light emitting apparatus 2000 is similar to the projection apparatus 200, except as described herein or as may be inherent. Here, the light emitting apparatus 2000 includes a processor 2050 in data communication with a networking device 2100, one or more input/output devices 2150, and a memory 2200. The memory 2200 includes programming 2250 operable to achieve the functionality of the light emitting apparatus 2000 as described herein. The networking device 2100 can communicate over a network 2500 with a remote sharing apparatus 2700 (which may be multiple receiving panels 2700), which likewise has a networking device 2850, a processor 2750, and an input/output device 2800. As is described in greater detail below, the sharing apparatus 2700 may receive information from the light emitting apparatus 2000 and sharing the information with a third party.

According to an embodiment, the input/output device 2150 includes a light source 2150a operable to output light waves. It shall be understood that light waves as used herein includes electromagnetic radiation of any wavelength, whether the electromagnetic radiation is in the visible spectrum or not. The light source may include at least one lens for directing the light waves toward a receiving panel. As used herein, the term "panel" is not limited to a flat or level surface, but may include a flat or level surface, as well as a surface exhibiting undulations or waves. Therefore, a receiving panel can be any surface towards which the light waves are directed, regardless of the surface characteristics exhibited by the surface.

As shown in FIGS. 13A and 13B, the light source 2150a emits light waves 2152 toward a receiving panel 2160 at a projection angle Q. The receiving panel 2160 may be transparent or opaque. The light waves 2152 are received upon the receiving panel 2160. In embodiments where the light waves 2152 are in the visible spectrum, the light waves 2152 illuminate a pattern upon the receiving panel 2160 which may be visible to the naked eye. In some embodiments, the light waves 2152 may not be in the visible spectrum, and therefore the light waves 2152 received by the receiving panel 2160 may not be visible to the naked eye. The light waves 2152 may be adjusted to provide a focused pattern as described in greater detail below regarding FIG. 15.

In one embodiment, illustrated in FIGS. 14A and 14B, at least two light sources 2150a and 2150b are incorporated into the light emitting apparatus 2000. Here, the light sources 2150a and 2150b emit two different light waves 2152a and 2152b towards the receiving panel 2160. The first light wave 2152a hits the receiving panel 2160 at point P. The second light wave 2152b hits the receiving panel at point P2. The respective light waves 2152a and 2152b may then be adjusted such that the light waves 2152a and 2152b meet at a focal point FP at the receiving panel 2160. In embodiments, the meeting of the light waves 2152a and 2152b at the focal point FP results in a haptic stimulation at the receiving panel 2160.

The input/output device 2150 may optionally additionally include a camera 2152c operable to capture images or video of a display. The images or video from the camera 2152c may be transmitted (e.g., over the network 2500) to the sharing apparatus 2700. The sharing apparatus 2700 may include a projector (e.g., as the output device 2800) for projecting the image from the camera 2152c to a third party. In embodiments, the camera 2152 transmits, and the sharing apparatus 2700 receives and projects, the images in real time to the third party. In another embodiment, the images and/or video from the camera 2152 are stored (e.g., in memory 2200) for later use.

Figure 15:
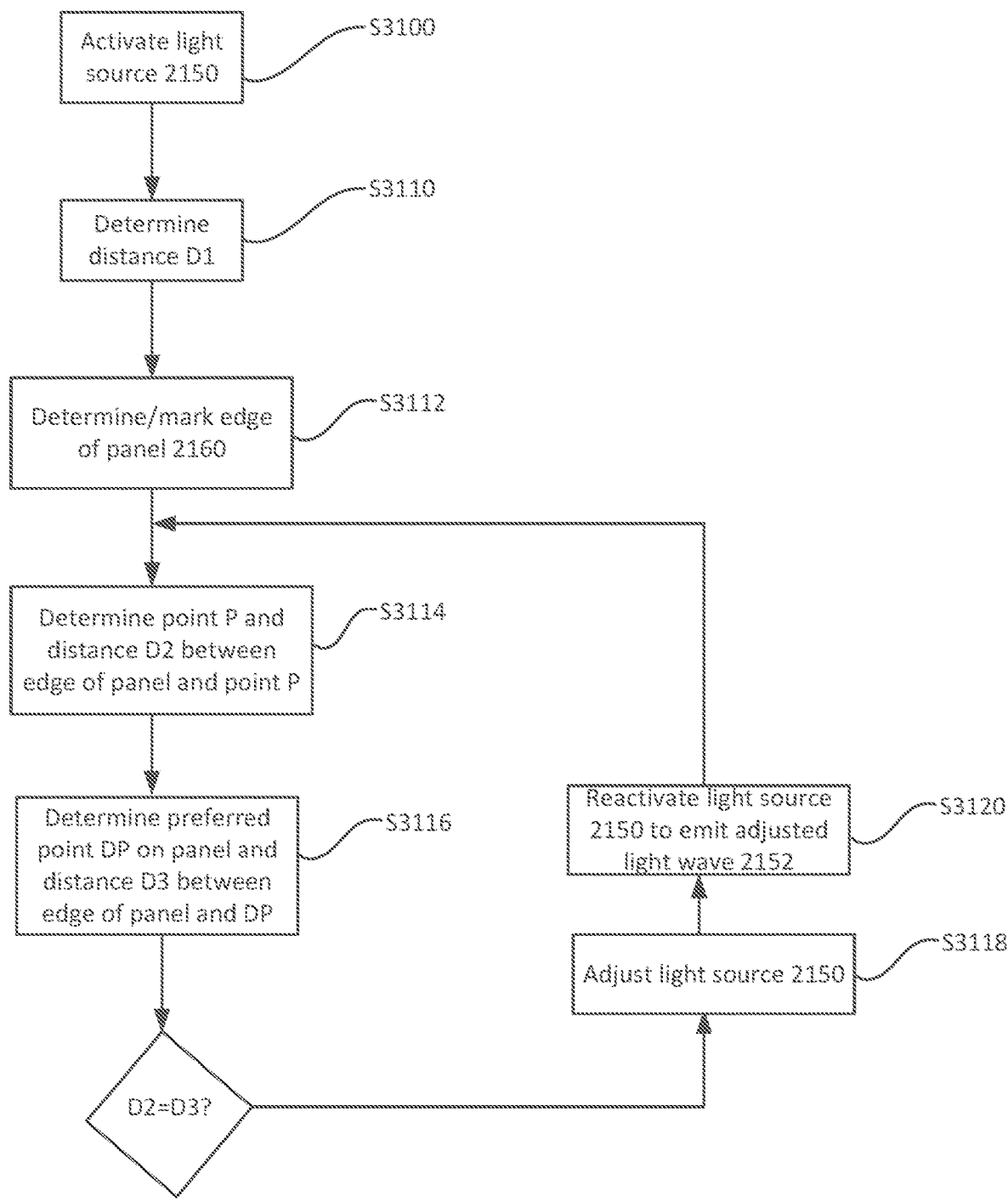
FIG. 15 is a flowchart illustrating various steps performed by a light emitting apparatus according to an embodiment of the invention.

FIG. 15 illustrates a closed loop system having various steps performed by the light emitting apparatus 2000 in conjunction with the programming 2250 effected by the processor 2050. The process starts at step S3100, where the light emitting apparatus 2000 activates a light source 2150 to emit a light wave 2152 in the direction of a receiving panel 2160. Optionally at step S3100, a camera 2150 may also be activated to begin filming the receiving panel 2160. At step S3110, the light emitting apparatus 2000 determines a distance D1 between the light source 2150 and the receiving panel 2160. At step S3112, the apparatus 2000 determines an edge of the panel 2160. Then, at step S3114, the apparatus 2000 determines the distance D2 from the edge of the panel 2160 and the point P where the light wave 2152 hits the receiving panel 2160. At step S3116, the programming determines the preferred point DP at which the light wave 2152 should hit the panel 2160, and the distance D3 from the edge of the panel 2160 to the preferred point DP. The preferred point DP may be based on environmental conditions in the area of the panel 2160, such as the current lighting, the angle of projection Q, the distance D1 from the light source 2150, etc. Because the environment changes, the preferred point DP may also change. Accordingly, the process may be performed iteratively to ensure that the light wave 2152 always hits the panel 2160 at the preferred point DP. If D2 does not equal D3, then at step S3118, the light source 2150 is adjusted accordingly. At step S3120, the light source 2150 is activated to provide an adjusted light wave in the direction of the receiving panel 2160. As noted above, because the preferred point DP may be in constant change due to a change in environmental conditions, the process then returns to step S3114 to ensure that the light wave 2152 always hits the panel 2160 at the preferred point DP. The process may repeat until the apparatus 2000 is deactivated.

Figure 16:
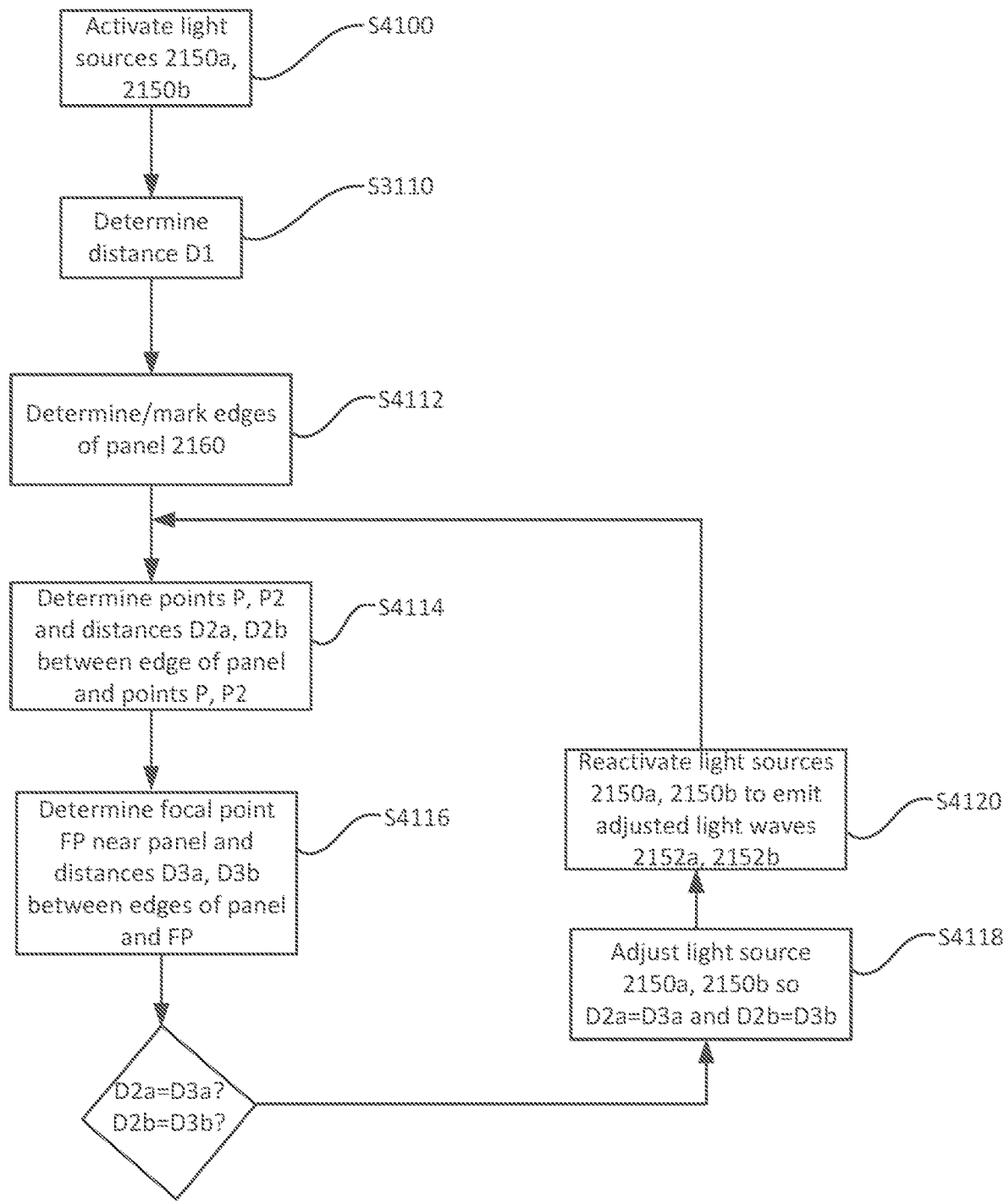
FIG. 16 is a flowchart illustrating various steps performed by a light emitting apparatus according to another embodiment of the invention.

As described above, the apparatus 2000 may include more than one light source 2150a, 2150b. FIG. 16 illustrates a closed loop system having various steps performed by the light emitting apparatus 2000 in conjunction with the programming 2250 effected by the processor 2050 wherein the light emitting apparatus includes more than one light source 2150a, 2150b. Here, the process begins at step S4100, where the light sources 2150a and 2150b are concurrently activated. Optionally at step S4100, a camera 2150 may also be activated to begin filming the receiving panel 2160. At step S4110, the apparatus 2000 determines a distance D1 between the light sources 2150a and the receiving panel 2160. At step S4112, the apparatus 2000 determines the respective edges of the panel 2160. Then, at step S4114, the apparatus 2000 determines the distances D2a and D2b from the respective edges of the panel 2160 and the points P and P2 where the light wave 2152a and 2152b respectively hit the receiving panel 2160. At step S4116, the programming determines the focal point FP at which the light waves 2152a and 2152b should combine to hit the panel 2160, and the distances D3a and D3b from the edges of the panel 2160 to the focal point DP. If D2a does not equal D3a, then at step S4118, the light source 2150a is adjusted accordingly. Likewise, if D2b does not equal D3b, then the light source 2150b is adjusted accordingly. At step S4120, the light sources 2150a, 2150b are activated to provide adjusted light waves 2152a', 2152b' in the direction of the receiving panel 2160, which converge at focal point FP. Because of environmental changes, focal point FP may also change. Accordingly, the process may be performed iteratively to ensure that the light waves 2152a', 2152b' always converge at the focal point FP. Thus, the process may returns to step S4114 and repeat until the apparatus 2000 is deactivated. It shall be understood that the focal point FP may, but need not be directly adjacent the panel 2160.

Figure 17:
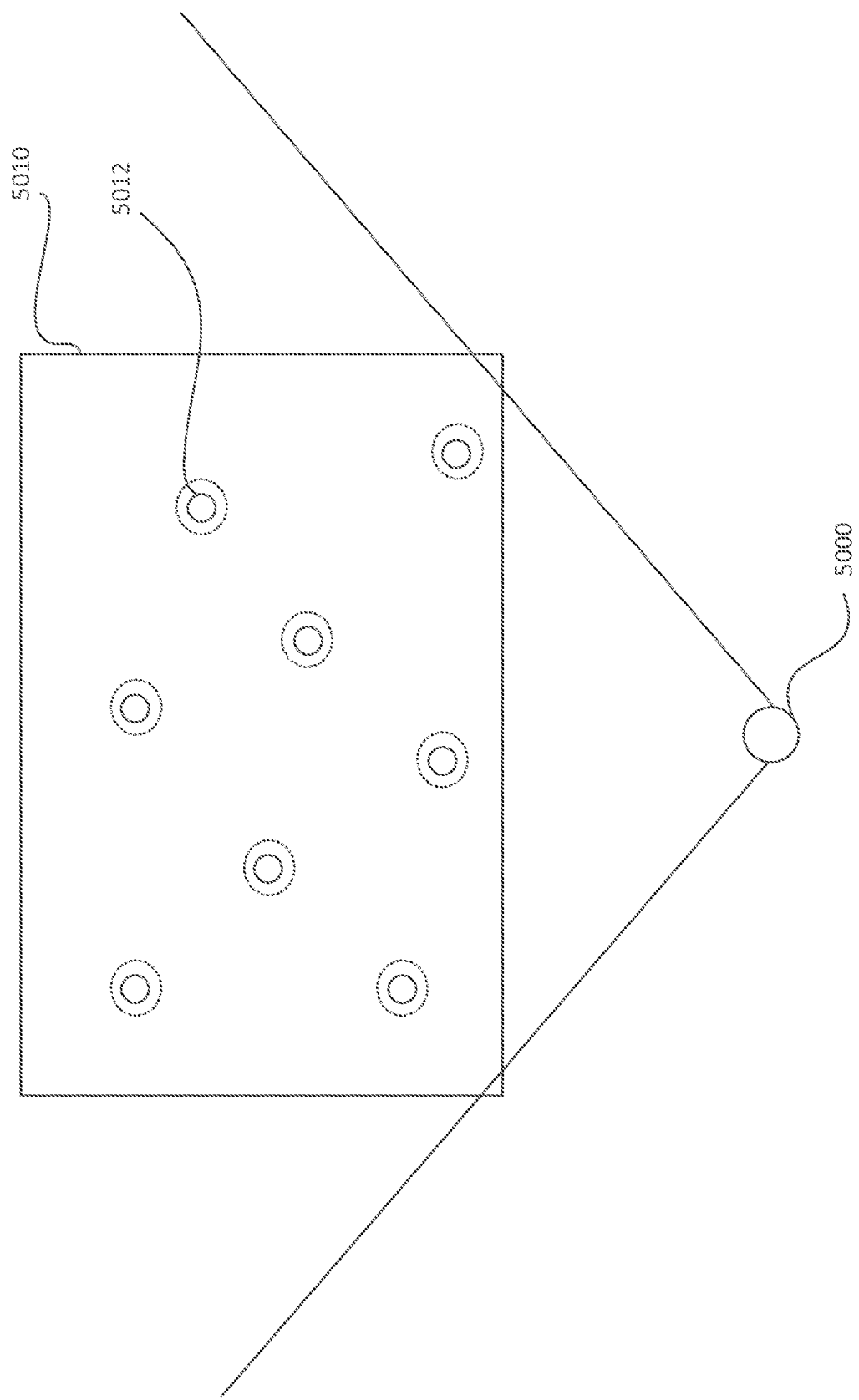
FIG. 17 is a perspective view of a projection apparatus system according to still another embodiment of the invention.

In a further embodiment, illustrated in FIG. 17, an apparatus 5000 is designed as a scanning and marking apparatus to aid in identifying and optionally reducing irregularities on a surface or in an environment. The apparatus 5000 may be substantially similar to the apparatus 200, 1000 as described herein, except as may be shown and/or described. Here, the apparatus 5000 is configured as a scanning device equipped with programming for recognizing abnormalities. Consider, for example, a hood 5010 on a vehicle, as illustrated in FIG. 17. The hood 5010 may have one or more irregularities 5012. The irregularities 5012 may be dents caused by hail damage (or any other impact), areas where the paint is chipped or discolored, or any other irregularity. The irregularities 5012 may be significant such that they can be seen by the human eye. However, in embodiments, the irregularities 5012 may be difficult to see. Accordingly, the scanning apparatus 5000 may be utilized to scan an area to highlight irregularities, and particularly those irregularities that may be difficult to see.

In an embodiment, the scanning apparatus 5000 may project an image onto the surface 2010. The image may be visible or invisible, and in embodiments may comprise an array of visible or invisible light (e.g., in the ultraviolet range). In another embodiment, the scanning apparatus 5000 may instead project sound waves toward the surface 5010. In still other embodiments, other forms of waves (e.g., thermal, such as thermographic signal reconstruction) to identify irregularities on the surface 5010. The scanning apparatus 5000 may include a built-in camera or other image scanner/reader, or the image scanner/reader may be separate from the scanning apparatus 5000. The image scanner is configured to review the image projected onto the surface 5010, or to review reflected waves bouncing off the surface 5010, as the case may be. At the areas of irregularities 5012, the image (or reflective waves) may be distorted as seen by the image scanner. Programming associated with the apparatus 5000 may identify the areas of irregularities based on image from the image scanner. Optionally, the scanning apparatus 5000 may mark the surface 5010 at the areas of irregularity. For example, a light (e.g., laser, image, etc.) may project from the scanning apparatus 5000 at each of the areas of irregularity to alert a user to the problematic area. In embodiments, the marking of the irregularity may be permanent (e.g., via paint, laser etching, etc.) or semi-permanent (e.g., via chalk, excitation of smart color-changing particles, etc.). The scanning apparatus 5000 may be equipped with means (e.g., a sprayer) for depositing the paint or other marking medium, and may therefore be mobile to allow the scanning apparatus 5000 to adequately move about the area of the surface 5010 so as to mark the irregularities.

The programming associated with the scanning apparatus 5000 may be tailored for a particular environment; however, the operation of the scanning apparatus 5000 remains virtually unchanged regardless of the environment. For example, in one embodiment, the scanning apparatus 5000 may be able to scan, identify abnormalities, and optionally mark abnormalities on roof shingles (e.g., due to hail damage). In another embodiment, the scanning apparatus 5000 is programmed to scan and find abnormalities on a road surface (e.g., potholes). Here, the scanning apparatus 5000 may be configured to direct light to a pothole so as to alert the driver to avoid hitting the pothole. In certain embodiments, the scanning apparatus 5000 may be in communication (e.g., wired or wireless communication) with one or more automotive systems which may be able to proactively adjust in advance of the pothole (e.g., increase the damping capabilities of the shock absorbers) so that the vehicle is not harmed, or the harm can be minimized.

In still another embodiment, the scanning apparatus 5000 may be configured to identify abnormalities on a person's skin (e.g., the presence of concerning moles) or in a person's mouth (e.g., movement of gums as an indication of gingivitis). Here, the programming may utilize self-learning in order to more accurately identify abnormalities. For example, the programming may initially establish a baseline scan for a person. When the scanning apparatus 5000 conducts subsequent scans, the subsequent scans may be compared against the baseline to determine the presence of previously undetected abnormalities, or areas where previously identified abnormalities have changed since the last scan. The scanning apparatus 5000 may mark the areas of new abnormalities and/or areas where abnormalities have changed such that a physician can very quickly and easily identify areas of interest for further review. The scans can be stored in a secure database which may be accessible by a patient and/or the patient's healthcare providers.

In yet another embodiment, the scanning apparatus 5000 may be configured to recognize unsafe conditions. For example, the scanning apparatus 5000 may be utilized in a warehouse, and can identify where packages are stacked incorrectly (e.g., via identifying and/or measuring packages as described below, by determining that an object protrudes outside of a predetermined threshold area, etc.). The scanning apparatus 5000 can mark the area of the unsafe condition (e.g., by projecting an image onto the ground alerting people to stay away from the unsafe area), and can further sent an alert to ensure that the situation is rectified. As shall be understood by those of skill in the art, other dangerous conditions in many different environments can be identified, marked, and expediently rectified.

In a further embodiment, the scanning apparatus 5000 may utilize night vision (e.g., image intensification, thermal imaging, etc.) to scan an area to identify the presence of objects that would otherwise be imperceptible to the human eye. For example, the scanning apparatus 5000 may utilize night vision to sense and identify an assailant in an attempt to get away from law enforcement. Once the scanning apparatus 5000 has identified the location of the assailant, the scanning apparatus may mark the location of the assailant, including movement of the assailant. In one embodiment, the scanning apparatus 5000 is elevated (e.g., on a tower or helicopter), and a laser is used to mark the assailant such that law enforcement on the ground can quickly and easily locate the assailant. In another embodiment, the marking may be invisible to the human eye, and the location information can be provided to law enforcement officers (e.g., latitude/longitude, street names, etc.) such that the assailant is not made aware of the marking.

Moving on, according to another embodiment, the scanning apparatus 5000 can aid in building processes. For example, the scanning apparatus 5000 may project an image onto an area where it is desirable to have a level surface. The scanning apparatus 5000 may, via the projected image and image scanner, identify low-lying areas or areas that are not level. The scanning apparatus 5000 may mark the low-lying area such that additional material may be provided. In one specific implementation, the scanning apparatus 5000 may be utilized for road building. The scanning apparatus 5000 can scan, locate areas that are not level, and optionally mark those areas so that the road can be leveled. This may be particularly useful where several layers of material are deposited onto a surface, as one can quickly and easily ensure that each layer is level before moving onto the next.

In still another embodiment, a system is designed as a scanning and measuring and/or counting apparatus. Here, the scanning apparatus may be substantially similar to the scanning apparatus described herein except as may be shown or described herein. The scanning apparatus may include programming for determining edges of a package and/or measuring the edges of the package. The size of the package can be utilized by the programming to verify, for example, payment for the item, or where the package should be stored. The programming may be able to measure and identify individual packages, as well as identify size and dimensions of a collective group of packages. For example, the scanning apparatus can quickly and easily assess the number of packages for inventory purposes. In embodiments, the scanning apparatus can scan the package prior to, or as, a shopper is placing the item into his or her cart. The scanning apparatus can identify the package, and determine the correct cost of the item. In another embodiment, the scanning apparatus can identify one or more packages after they have been placed in a shopping cart. Inventory can be quickly and easily updated based on the information, and the sale price of the goods can be quickly and easily affirmed.

In still another embodiment, a scanning and counting system may receive information from a user related to a scanning area. For example, a pharmacist may enter prescription information into the system, such as the number of pills prescribed by the doctor. The pharmacist may then dispense the prescription onto the scanning area. The system may scan the area and determine the edge of the pills. Once the edge of each of the pills has been detected, the system may then project an initial image onto the scanning area. The initial image may include, for example, one or more images near each of the pills on the scanning area. In one example, the projection is a circle surrounding each of the pills. The system may then scan the scanning area to determine the number of pills atop the scanning area. The system may then access the information into the system to determine the correct number of pills to fill the prescription. The system may then project a second image onto the scanning area. The second image may include for example, one or more images near each of the pills on the scanning area. In one example, the second image is a dot projected upon each of the pills. In embodiments, the projected dots may be configured based on the number of pills in the scanning area. For example, if the prescription calls for 12 pills, then a green dot may be projected upon each of 12 pills. Any excess pills in the scanning area may receive a red dot. Of course, images other than dots may be projected onto or near the pills. If less than 12 pills are in the scanning area, a third image may be projected onto the scanning area to alert the pharmacist that additional pills are needed in the scanning area. The pharmacist may then disperse additional pills onto the scanning area and the process may be repeated until at least as many pills are on the scanning area as required by the prescription. In some embodiments, a means for separating excess pills may be included as part of the system. For example, an arm may be activated to separate the pills with the green dots from the pills with the red dots. The pills with the green dots may then be placed into the container for the patient, while the excess pills are returned to the storage container.

Thus has been described systems, methods, and apparatus for projecting an image onto a surface. Many different arrangements of the described invention are possible without departing from the spirit and scope of the present invention. Embodiments of the present invention are described herein with the intent to be illustrative rather than restrictive. Alternative embodiments will become apparent to those skilled in the art that do not depart from its scope. A skilled artisan may develop alternative means of implementing the disclosed improvements without departing from the scope of the present invention.

Further, it will be understood that certain features and subcombinations are of utility and may be employed without reference to other features and subcombinations and are contemplated within the scope of the claims. Not all steps listed in the various figures and description need to be carried out in the specific order described. The description should not be restricted to the specific described embodiments.

The invention claimed is:

1. A marking and display system, comprising:
a projection apparatus embodied in a housing, the projection apparatus comprising:
   a processor in data communication with computer memory, the computer memory comprising a program having machine readable instructions that, when effectuated by the processor, perform the following steps:
      (a) receive information regarding a plurality of objects on a scanning area from a user;
      (b) project a first image onto the scanning area;
      (c) scan the scanning area to determine at least one characteristic about the plurality of objects on the scanning area;
      (d) project a second image onto the scanning area, wherein the second image is a plurality of second images based at least partially on the scan, and each of the plurality of second images is associated with a respective object of the plurality of objects;
      (e) compare the scan to the information provided by the user; and
      (f) project a third image onto the scanning area, wherein the third image is based on the scan and the information provided by the user, the third image thereby identifying a difference between the number of objects on the scanning area and the number of objects that should be on the scanning area;
wherein:
   the information regarding the object includes a number of objects that should be on the scanning area;
   each of the plurality of second images is a circle;
   the third image is one or more third images;
   if the difference between the number of objects on the scanning area and the number of objects that should be on the scanning area is an excess of objects in the scanning area, each of the one or more third images is associated with a respective object of the excess of objects; and
   if the difference between the number of objects on the scanning area and the number of objects that should be on the scanning area is a lack of objects in the scanning area, each of the one or more third images identifies a location where a supplemental object should be provided onto the scanning area.

2. The system of claim 1, wherein the second image is the number of objects on the scanning area.

3. The system of claim 1, wherein the object is a pharmaceutical.

4. A marking and display system, comprising:
a projection apparatus embodied in a housing, the projection apparatus comprising:
  a processor in data communication with computer memory, the computer memory comprising a program having machine readable instructions that, when effectuated by the processor, perform the following steps:
    (a) receive information regarding a plurality of objects on a scanning area from a user;
    (b) project a first image onto the scanning area;
    (c) scan the scanning area to determine at least one characteristic about the plurality of objects on the scanning area;
    (d) project at least one second image onto the scanning area based at least partially on the scan, the at least one second image being associated with at least one respective object of the plurality of objects;
    (e) compare the scan to the information provided by the user; and
    (f) if the difference between the number of objects on the scanning area and the number of objects that should be on the scanning area is a lack of objects in the scanning area, project a third image onto the scanning area, wherein the third image is based on the scan and the information provided by the user;
wherein:
  the information regarding the object includes a number of objects that should be on the scanning area.

5. The system of claim 4, wherein the at least one second image is a closed shape.

6. The system of claim 5, wherein the closed shape is a circle.

7. The system of claim 4, wherein the at least one second image is a dot.

8. The system of claim 7, wherein the at least one second image is a green dot.

9. The system of claim 7, wherein the at least one second image is a red dot.

10. The system of claim 4, wherein the at least one second image comprises a plurality of second images, wherein a first subset of the plurality of second images comprises a first unique identifier and a second subset of the plurality of second images comprises a second unique identifier.

11. The system of claim 10, wherein the first unique identifier comprises a first colored image and the second unique identifier comprises a second colored image.

12. The system of claim 4, wherein steps (b)-(f) are repeated until the number of objects in the scanning area is equal to the number of objects that should be in the scanning area.

13. The system of claim 4, further comprising an arm operatively coupled to the housing, wherein the arm is selectively activated to separate objects on the scanning area.

14. The system of claim 4, wherein the plurality of objects comprises a plurality of pharmaceuticals.

15. The system of claim 1, wherein steps (b)-(f) are repeated until the number of objects in the scanning area is equal to the number of objects that should be in the scanning area.

16. The system of claim 1, further comprising an arm operatively coupled to the housing, wherein the arm is selectively activated to separate objects on the scanning area.

* * * * *